(12) United States Patent
Gupta et al.

(10) Patent No.: US 8,855,007 B2
(45) Date of Patent: Oct. 7, 2014

(54) CONFIGURING AN IDENTIFIER FOR AN ACCESS POINT

(75) Inventors: Rajarshi Gupta, Santa Clara, CA (US); Aamod D. Khandekar, San Diego, CA (US); Gavin B. Horn, La Jolla, CA (US); Parag A. Agashe, San Diego, CA (US); Peerapol Tinnakornsrisuphap, San Diego, CA (US); Ravi Palanki, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 12/272,672

(22) Filed: Nov. 17, 2008

(65) Prior Publication Data

US 2009/0129291 A1    May 21, 2009

Related U.S. Application Data

(60) Provisional application No. 60/989,054, filed on Nov. 19, 2007, provisional application No. 60/989,057, filed on Nov. 19, 2007, provisional application No. 61/025,683, filed on Feb. 1, 2008.

(51) Int. Cl.
*H04L 12/28* (2006.01)
*H04W 24/02* (2009.01)
*H04W 8/26* (2009.01)
*H04W 92/20* (2009.01)

(52) U.S. Cl.
CPC .............. *H04W 24/02* (2013.01); *H04W 92/20* (2013.01); *H04W 8/26* (2013.01)
USPC ........................................................ 370/254

(58) Field of Classification Search
USPC ........................................................ 370/254
See application file for complete search history.

(56) References Cited

U.S. PATENT DOCUMENTS

| 5,379,351 A | 1/1995 | Fandrianto et al. |
| 6,016,112 A | 1/2000 | Knudsen |

(Continued)

FOREIGN PATENT DOCUMENTS

| CN | 101061389 A | 10/2007 |
| GB | 2428942 A | 2/2007 |

(Continued)

OTHER PUBLICATIONS

Burrows, et al., "A Block-sorting Lossless Data Compression Algorithm", Technical Report 124, Digital Equipment Corporation, May 10, 1994.

(Continued)

*Primary Examiner* — Mark Rinehart
*Assistant Examiner* — Maharishi Khirodhar
(74) *Attorney, Agent, or Firm* — John J. Ketchum

(57) ABSTRACT

An access point is configured based on acquired information. An access point may be configured based on the configuration(s) of at least one other access point. An identifier to be transmitted by an access point may be selected based on the identifier(s) transmitted by at least one other access point. An access point may configure itself with assistance from a configuration server. For example, the access point may send information such as the location of the access point to a configuration server and the configuration server may respond with a list of neighboring access points for that access point. A configuration server may provide configuration information to an access point based on the location of the access point. A configuration server also may direct an access point to a different configuration server.

65 Claims, 19 Drawing Sheets

(56) References Cited

U.S. PATENT DOCUMENTS

| | | | |
|---|---|---|---|
| 6,049,298 A | 4/2000 | Knudsen | |
| 6,192,244 B1 | 2/2001 | Abbadessa | |
| 6,282,577 B1 | 8/2001 | Okanoue et al. | |
| 6,629,081 B1 | 9/2003 | Cornelius et al. | |
| 6,810,269 B1 | 10/2004 | Aramaki | |
| 6,885,991 B2 | 4/2005 | Skonberg et al. | |
| 7,007,166 B1 | 2/2006 | Moskowitz et al. | |
| 7,069,234 B1 | 6/2006 | Cornelius et al. | |
| 7,106,972 B2 | 9/2006 | Alfano et al. | |
| 7,167,844 B1 | 1/2007 | Leong et al. | |
| 7,180,879 B2 | 2/2007 | Sinnarajah et al. | |
| 7,477,920 B2 | 1/2009 | Scheinert et al. | |
| 7,613,444 B2 | 11/2009 | Lindqvist et al. | |
| 7,623,866 B1 | 11/2009 | Spitzer | |
| 2004/0233855 A1 | 11/2004 | Gutierrez et al. | |
| 2004/0253943 A1 | 12/2004 | Suzuki et al. | |
| 2005/0037798 A1 | 2/2005 | Yamashita et al. | |
| 2005/0099972 A1 | 5/2005 | Motegi et al. | |
| 2005/0135788 A1 | 6/2005 | Fujii et al. | |
| 2005/0148368 A1* | 7/2005 | Scheinert et al. | 455/561 |
| 2006/0121907 A1 | 6/2006 | Mori et al. | |
| 2006/0126536 A1 | 6/2006 | Patel et al. | |
| 2007/0064653 A1 | 3/2007 | Jang et al. | |
| 2007/0097938 A1 | 5/2007 | Nylander et al. | |
| 2007/0097939 A1 | 5/2007 | Nylander et al. | |
| 2007/0097983 A1 | 5/2007 | Nylander et al. | |
| 2007/0105527 A1 | 5/2007 | Nylander et al. | |
| 2007/0105568 A1 | 5/2007 | Nylander et al. | |
| 2007/0183427 A1 | 8/2007 | Nylander et al. | |
| 2007/0213086 A1 | 9/2007 | Claussen et al. | |
| 2007/0254620 A1* | 11/2007 | Lindqvist et al. | 455/403 |
| 2008/0070580 A1 | 3/2008 | Menich et al. | |
| 2008/0076425 A1 | 3/2008 | Khetawat et al. | |
| 2008/0101301 A1 | 5/2008 | Thomas et al. | |
| 2008/0139249 A1 | 6/2008 | Kim | |
| 2008/0304439 A1* | 12/2008 | Keevill et al. | 370/328 |
| 2009/0003279 A1 | 1/2009 | Abusch-Magder et al. | |
| 2009/0005099 A1 | 1/2009 | Jung et al. | |
| 2009/0042593 A1 | 2/2009 | Yavuz et al. | |
| 2009/0052418 A1 | 2/2009 | Semper | |
| 2009/0092096 A1 | 4/2009 | Czaja et al. | |
| 2009/0129354 A1 | 5/2009 | Gupta et al. | |
| 2009/0131049 A1 | 5/2009 | Osborn | |
| 2009/0196266 A1 | 8/2009 | Wu et al. | |
| 2010/0130212 A1 | 5/2010 | So et al. | |
| 2010/0173630 A1 | 7/2010 | Han et al. | |
| 2010/0197311 A1 | 8/2010 | Walldeen et al. | |
| 2010/0267386 A1 | 10/2010 | Lim et al. | |

FOREIGN PATENT DOCUMENTS

| | | |
|---|---|---|
| GB | 2452797 | 3/2009 |
| JP | H10191421 A | 7/1998 |
| JP | 2000354048 A | 12/2000 |
| JP | 2001069151 A | 3/2001 |
| JP | 2002218528 A | 8/2002 |
| JP | 2005142967 A | 6/2005 |
| JP | 2005328152 A | 11/2005 |
| JP | 2006140829 A | 6/2006 |
| JP | 2007266785 A | 10/2007 |
| JP | 2009510969 A | 3/2009 |
| JP | 2009510970 A | 3/2009 |
| JP | 2009510971 A | 3/2009 |
| JP | 2009510972 A | 3/2009 |
| JP | 2009510973 A | 3/2009 |
| KR | 1020040029042 | 4/2004 |
| KR | 1020040059634 | 7/2004 |
| KR | 20070052347 A | 5/2007 |
| RU | 2273964 C2 | 4/2006 |
| RU | 2297663 C2 | 4/2007 |
| RU | 2299518 C2 | 5/2007 |
| WO | WO03019798 A2 | 3/2003 |
| WO | WO03039104 A1 | 5/2003 |
| WO | WO03046742 A1 | 6/2003 |
| WO | 2004040938 | 5/2004 |
| WO | WO2004088934 | 10/2004 |
| WO | WO-2007040450 A1 | 4/2007 |
| WO | WO-2007040454 A2 | 4/2007 |

OTHER PUBLICATIONS

Geiger, et al., "Audio Coding based on Integer Transforms", 111th AES Convention, Convention Paper #5471, Sep. 2001.

Knuth, The Art of Computer Programming, vol. 2: Seminumerical Algorithms, Third Edition. Addison-Wesley, 1997. ISBN 0-201-89684-2, pp. 65-66, 77-78, 80-81, 91, 145-148, 154, 384, 460, and 679.

Lehser, "Self Organising LTE/SAE Network—Operator Requirements & Examples," Sep. 25, 2006, pp. 1-15, XP002510901, Retrieved from the Internet: URL http://www.ikr.uni-stuttgart.de/Content/itg/fg524/Meeetings/2006-09-29-Ulm/index.html.

Liang, et al., "Fast Multiplierless Approximations of the DCT With the Lifting Scheme", IEEE Transactions on Signal Processing, vol. 49, No. 12, Dec. 2001. pp. 3032-3044.

McCaffrey, "Using Permutations in .NET for Improved Systems Security", Aug. 2003, http://msdn2.microsoft.com/en-us/library/aa302371.aspx.

Wang, "Fast Algorithms for the Discrete W Transform and for the Discrete Fourier Transform", IEEE Transactions on Acoustics. Speech, and Signal Processing, vol. 32, ASSP-32, No. 4, Aug. 1984, pp. 803-816.

International Search Report and Written Opinion—PCT/US08/083925, International Searching Authority—European Patent Office, Feb. 5, 2009.

Ericsson, "MCI conflict detection and resolution", 3GPP Draft; S5-071569, 3rd Generation Partnership Project (3GPP), Mobile Competence Centre; 650, Route Des Lucioles; F-06921 Sophia-Antipolis Cedex; France, vol. SA WG5, No. Roma; Aug. 22, 2007, XP050306211, pp. 1-4, [retrieved on Aug. 22, 2007].

Huawei, "Detection of conflicting cell identities", 3GPP Draft; R2-074216, 3rd Generation Partnership Project (3GPP), Mobile Competence Centre ; 650, Route Des Lucioles ; F-06921 Sophia-Antipolis Cedex ; France, vol. RAN WG2, No. Shanghai, China; Oct. 2, 2007, XP050136835, pp. 1-3, [retrieved on Oct. 2, 2007].

Taiwan Search Report—TW097144729—TIPO—Jul. 24, 2012.

* cited by examiner

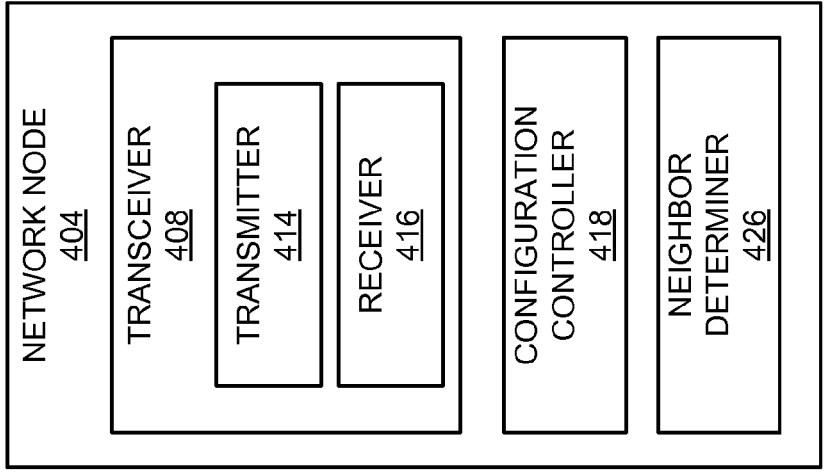
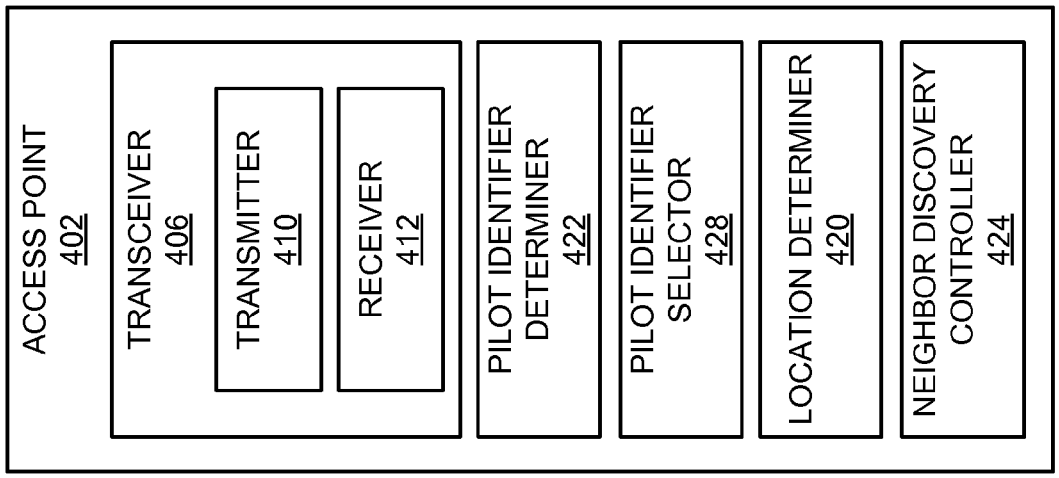
FIG. 4

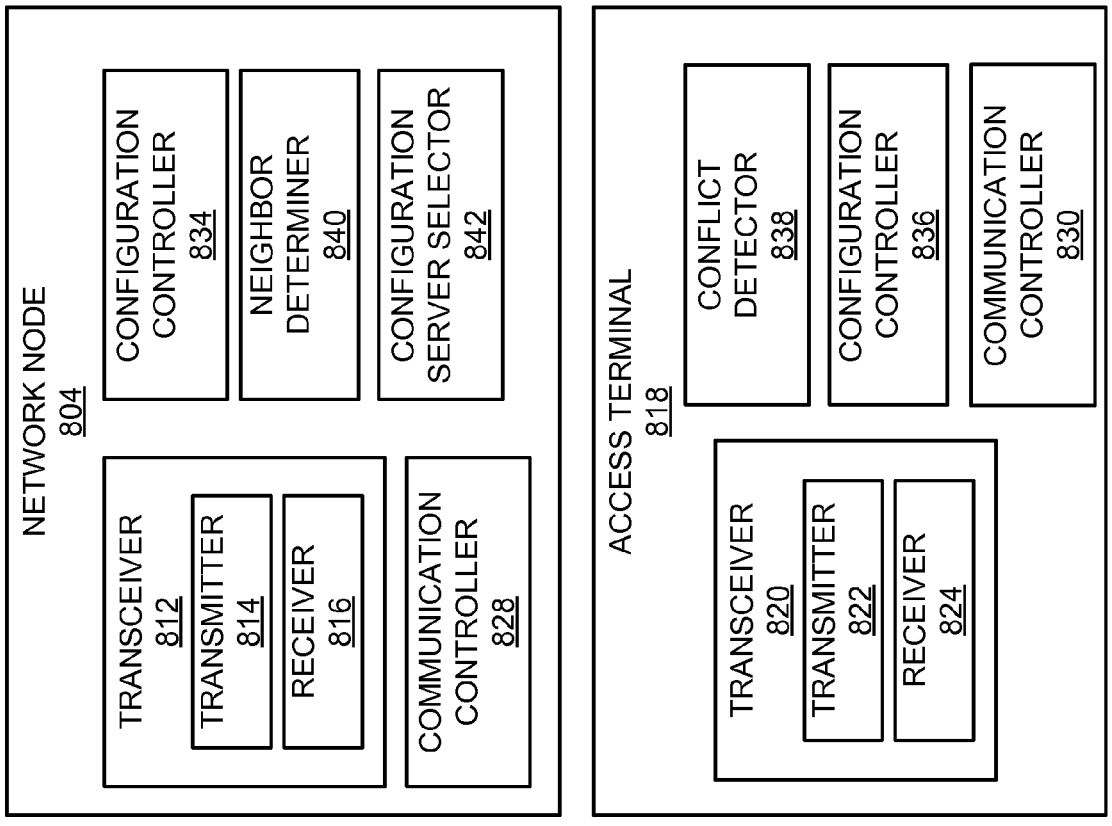
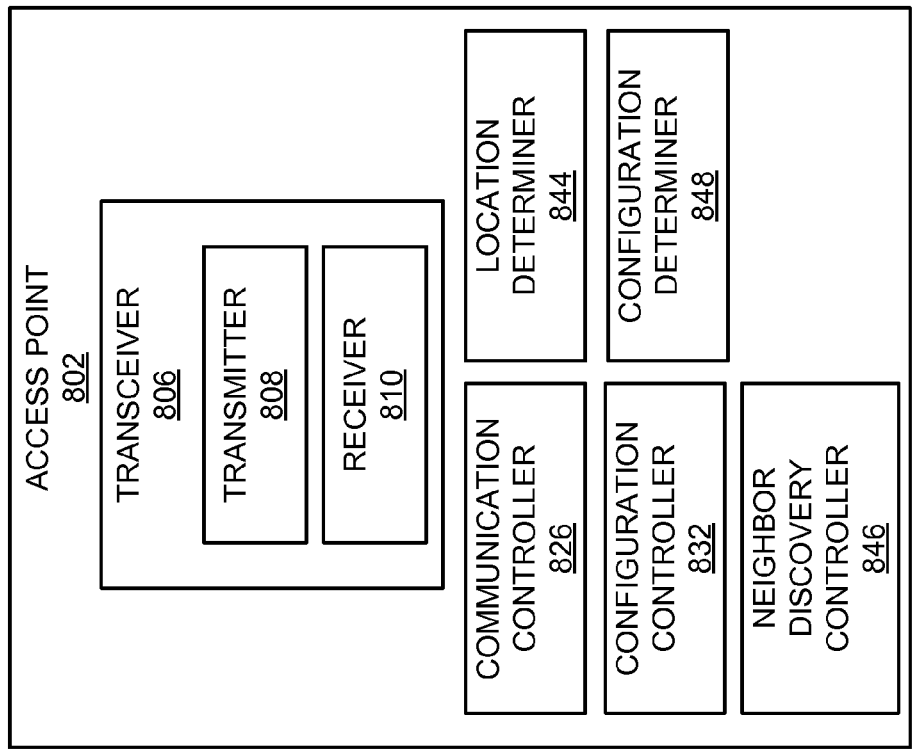
FIG. 8

CONFIGURING AN IDENTIFIER FOR AN ACCESS POINT

CLAIM OF PRIORITY UNDER 35 U.S.C. §119

This application claims the benefit of and priority to commonly owned U.S. Provisional Patent Application No. 60/989,054, filed Nov. 19, 2007; U.S. Provisional Patent Application No. 60/989,057, filed Nov. 19, 2007; and U.S. Provisional Patent Application No. 61/025,683, filed Feb. 1, 2008; the disclosure of each of which is hereby incorporated by reference herein.

CROSS-REFERENCE TO RELATED APPLICATION

This application is related to concurrently filed and commonly owned U.S. patent application Ser. No. 12/272,665, entitled "ACCESS POINT CONFIGURATION SCHEMES," the disclosure of which is hereby incorporated by reference herein.

BACKGROUND

1. Field

This application relates generally to communication and more specifically, but not exclusively, to configuring a communication node.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations (e.g., macro cells), small-coverage base stations may be deployed (e.g., installed in a user's home) to provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem.

In practice, these small-coverage base stations may be deployed in an ad-hoc manner and in relatively large numbers. Consequently, there is a need for improved techniques for configuring such base stations.

SUMMARY

A summary of sample aspects of the disclosure follows. It should be understood that any reference to the term aspects herein may refer to one or more aspects of the disclosure.

The disclosure relates in some aspect to configuring an access point. In various scenarios such an access point may take the form of a femto node, a relay node, a pico node, or some other type of node.

The disclosure relates in some aspect to configuring an access point based on the configuration(s) of at least one other access point. For example, an access point may acquire configuration information indicative of the configuration(s) of at least one neighboring access point and select one or more configuration parameters based on the acquired configuration information.

The disclosure relates in some aspect to determining an identifier to be used by (i.e., transmitted by) an access point. For example, an access point may select an identifier based on the identifier(s) used by (i.e., transmitted by) at least one other access point. These identifiers may comprise, for example, pilot identifiers (e.g., physical cell identifiers). For convenience, the description herein will refer to such an identifier as a pilot identifier.

The disclosure relates in some aspect to autonomous configuration of an access point. For example, once an access point is initialized (e.g., upon deployment, power-up, or reset), the access point may determine its location and then configure itself (e.g., by determining a configuration based on its location). Here, the access point may determine radio-frequency ("RF") parameters, optimization parameters, or other parameters. For example, the access point may determine a pilot identifier, a carrier frequency, a power profile, some other parameter, or a combination of two or more of these parameters.

The disclosure relates in some aspect to an access point that configures itself with assistance from a configuration server. For example, the access point may send information such as the location of the access point to a configuration server and the configuration server may respond with a list of any neighboring access points for that access point. The access point may then acquire configuration information indicative of the configuration(s) of the identified neighboring access point(s) and select one or more configuration parameters based on the acquired configuration information.

The disclosure relates in some aspects to providing configuration information to an access point. For example, a configuration server may provide configuration information to an access point based on the location of the access point.

The disclosure relates in some aspects to directing an access point to a configuration server. For example, a configuration server may direct an access point to another configuration server for configuration information.

BRIEF DESCRIPTION OF THE DRAWINGS

These and other sample aspects of the disclosure will be described in the detailed description and the appended claims that follow, and in the accompanying drawings, wherein:

FIG. 4 is a simplified block diagram of several sample aspects of components that may be employed in communication nodes;

FIG. 8 is a simplified block diagram of several sample aspects of components that may be employed in communication nodes;

Figure 1:
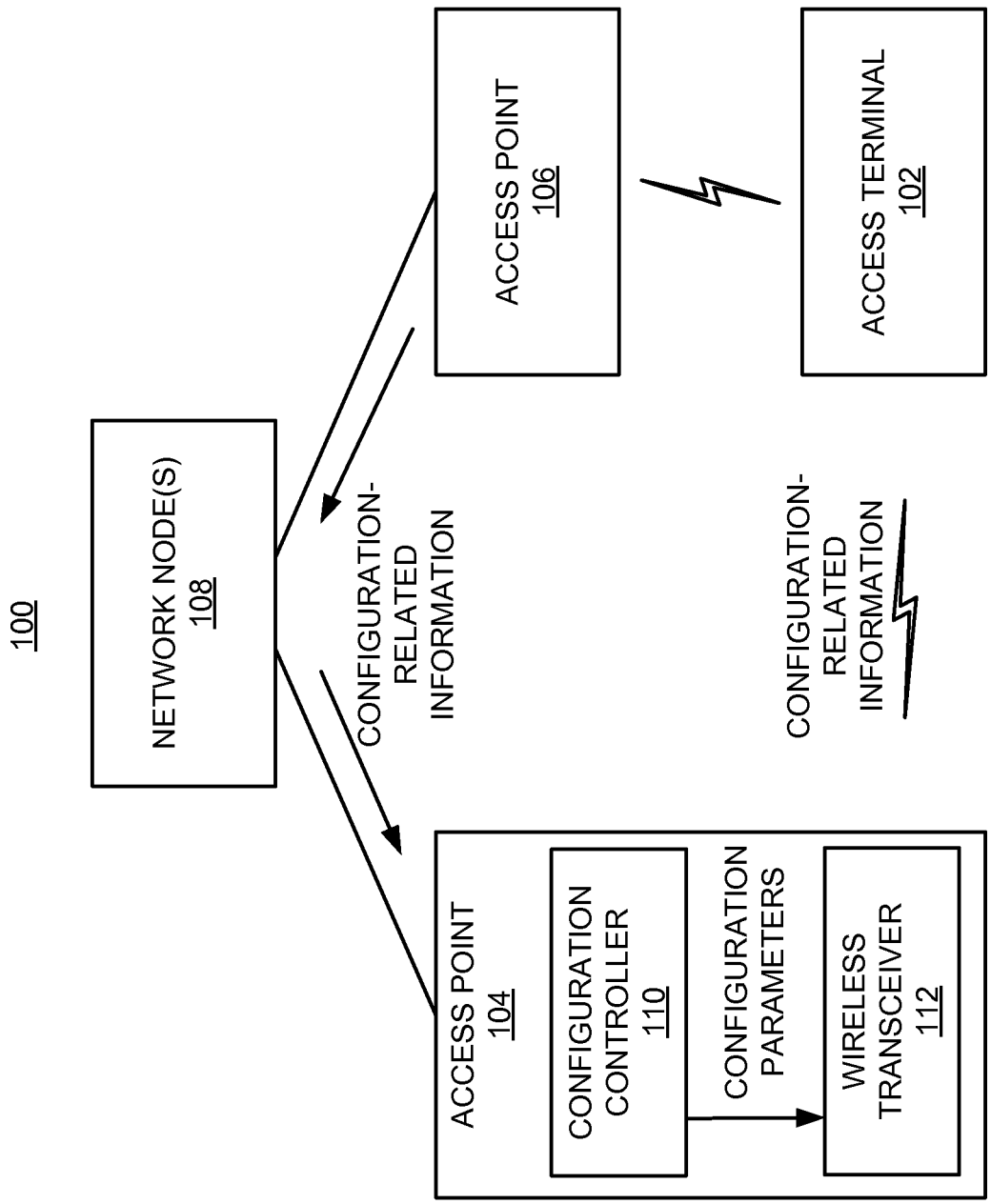
FIG. 1 is a simplified block diagram of several sample aspects of a communication system where an access point is configured based on received information.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, an access point as taught herein may be implemented or referred to as a base station, an eNodeB, a Home eNodeB, and so on. Also, an access terminal as taught herein may be implemented or referred to as a mobile, user equipment, and so on. In addition, a network node may be implemented or referred to as a configuration server; an operations, accounting, and management ("OAM") entity; a mobility manager; and so on. Other sample terminology is set forth in the following discussion.

Access points in the system 100 provide one or more services (e.g., network connectivity) for one or more wireless terminals (e.g., access terminal 102) that may be installed within or that may roam throughout an associated geographical area. For example, at various points in time the access terminal 102 may connect to an access point 104 or an access point 106. Each of the access points 104 and 106 may communicate with one or more network nodes (represented, for convenience, by network node 108) to facilitate wide area network connectivity. Such network nodes may take various forms such as, for example, one or more radio and/or core network entities (e.g., implemented as discussed above or as some other suitable network entity).

In some aspects, configuration of an access point such as access point 104 may be advantageously achieved by providing configuration functionality at the access point. For example, in a network that has a relatively large number of access points, it may be more efficient for the overall operation of the network if each access point has the capability to configure itself at least to some extent. In this way, the operator of the network (e.g., centralized entities managed by the operator) may be relieved of at least some of the burden of determining the appropriate configurations and keeping track of the configurations for all of these access points.

In the example of FIG. 1, the access point 104 includes a configuration controller 110 that configures the access point 104. Here, the configuration controller 110 may provide one or more configuration parameters that the access point 104 uses for communication-related operations. For example, the configuration controller 110 may provide configuration parameters for a wireless transceiver 112 such as a pilot identifier, operating frequency, and transmit power.

In some implementations the configuration controller 110 defines configuration parameters based on the configuration(s) of at least one other access point (e.g., a neighboring access point). To this end, the configuration controller 110 may receive configuration information from the other access point(s) and/or information that may be used to obtain configuration information from the other access point(s).

In some cases the access point 104 may communicate with the access point 106 to determine the configuration of the access point 106. For example, the access point 104 may communicate with the access point 106 via a backhaul (e.g., through the network node 108). As a more specific example, an eNodeB may receive a report (e.g., via an X2 interface) of a PCI used by a neighboring eNodeB.

Also, the access point 104 may acquire configuration-related information directly from the access point 106 via wireless signals. For example, the access point 104 may include a downlink receiver (not shown in FIG. 1) that receives signals transmitted by the access point 106. As a more specific example, the PCI used by an eNodeB may be heard over-the-air at another eNodeB through the use of a downlink receiver.

The access point 104 also may acquire configuration-related information via an access terminal (e.g., when the access terminal 102 is being served by the access point 104). For example, the access terminal 102 may forward information it acquires from the access point 106 (e.g., information derived from transmissions by the access point 106) to the access point 104. As a more specific example, user equipment may report the PCI used by an eNodeB to another eNodeB.

In some cases the access point 104 may receive configuration-related information from the network node 108. For example, the network node 108 may identify any neighbors of the access point 104 and send this neighbor information to the access point 104. The configuration controller 110 then uses this neighbor information to determine the configuration of the indicated neighbor(s).

In some cases the network node 108 sends a list of pilot identifiers to the access point 104. The access point 104 may then select its pilot identifier from the list. For example, the access point 104 may randomly select a pilot identifier from the list or select a pilot identifier based on a defined criterion or criteria. Here, the access point 104 may exclude any pilot identifiers used by other access points (e.g., neighboring access point) from its selection.

As a more specific example, an OAM entity may signal a list of PCI values to an eNodeB. This list may be cell specific.

The eNodeB may then select a PCI value for a cell from the list of PCIs. For example, the eNodeB may select a PCI value randomly from the list of PCIs.

In some cases the eNodeB may restrict the received list by removing a PCI that is reported by user equipment, reported by a neighboring eNodeB, heard over-the-air via a downlink, acquired in some other way, or acquired through a combination of two or more of these ways. The eNodeB may then select a PCI value randomly from the restricted list of PCIs or select a PCI value from the restricted list in some other way.

In some cases the access point 104 may provide information to a configuration server (e.g., as represented by the network node 108) to assist the configuration server in providing configuration information for the access point 104. For example, the access point 104 may determine its location and send corresponding location information to the network node 108. The network node 108 may then determine appropriate configuration information based on the location and send this configuration information to the access point 104, where the configuration controller 110 uses the configuration information to configure the access point 104.

In some cases, a configuration server (e.g., as represented by the network node 108) directs an access point to another configuration server for configuration information. For example, upon receiving a request from the access point 104 for configuration information, the network node 102 may redirect the access point 104 to another node (e.g., another configuration server). Such a redirection may be based on, for example, the location of the access point 104 and/or the load on one or more of the configuration servers.

Figure 2:
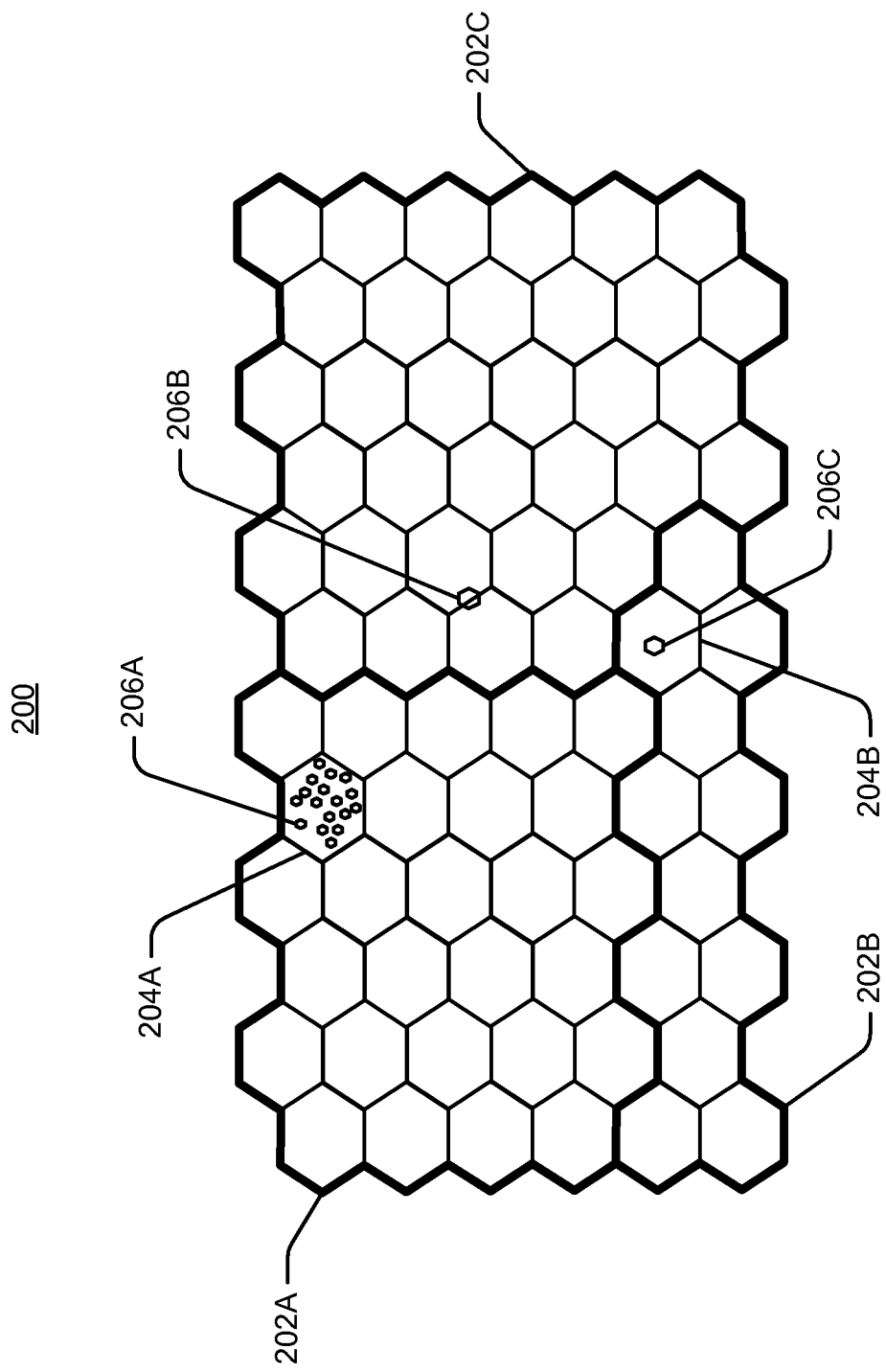
FIG. 2 is a simplified diagram illustrating sample coverage areas for wireless communication.

Configuration operations such as those described above may be advantageously employed in a network 200 as shown in FIG. 2 where some access points provide macro coverage and other access points provide smaller coverage. Here, macro coverage areas 204 may be provided by, for example, macro access points of a large area cellular network such as a 3G network, typically referred to as a macro cell network or a wide area network ("WAN"). In addition, smaller coverage areas 206 may be provided by, for example, access points of a residence-based or building-based network environment, typically referred to as a local area network ("LAN"). As an access terminal ("AT") moves through such a network, the access terminal may be served in certain locations by access points that provide macro coverage while the access terminal may be served at other locations by access points that provide smaller coverage. In some aspects, the smaller coverage access points may be used to provide incremental capacity growth, in-building coverage, and different services, all leading to a more robust user experience.

In the description herein, a node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). Also, a relay node may provide wireless coverage that enables an access point to communicate with other nodes in a network. In other words, a relay node may provide a wireless backhaul that facilitates connectivity to, for example, a network node or another relay node. In various applications, other terminology may be used to reference a macro node, a femto node, or other access point-type nodes. For example, a macro node may be configured or referred to as an access node, base station, access point, eNodeB ("eNB"), macro cell, and so on. Also, a femto node may be configured or referred to as a Home NodeB, Home eNodeB, access point, base station, access point base station, eNodeB, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. For convenience, the description herein may refer generally to operations and components of access points and femto nodes. It should be appreciated that these operations and components also may be applicable to other types of nodes (e.g., relay nodes and pico nodes).

In the example of FIG. 2, several tracking areas 202 (or routing areas or location areas) are defined, each of which includes several macro coverage areas 204. Here, areas of coverage associated with tracking areas 202A, 202B, and 202C are delineated by the wide lines and the macro coverage areas 204 are represented by the hexagons. As mentioned above, the tracking areas 202 also may include femto coverage areas 206. In this example, each of the femto coverage areas 206 (e.g., femto coverage area 206C) is depicted within one or more macro coverage areas 204 (e.g., macro coverage area 204B). It should be appreciated, however, that a femto coverage area 206 may not lie entirely within a macro coverage area 204. Also, one or more pico or femto coverage areas (not shown) may be defined within a given tracking area 202 or macro coverage area 204.

Figure 9:
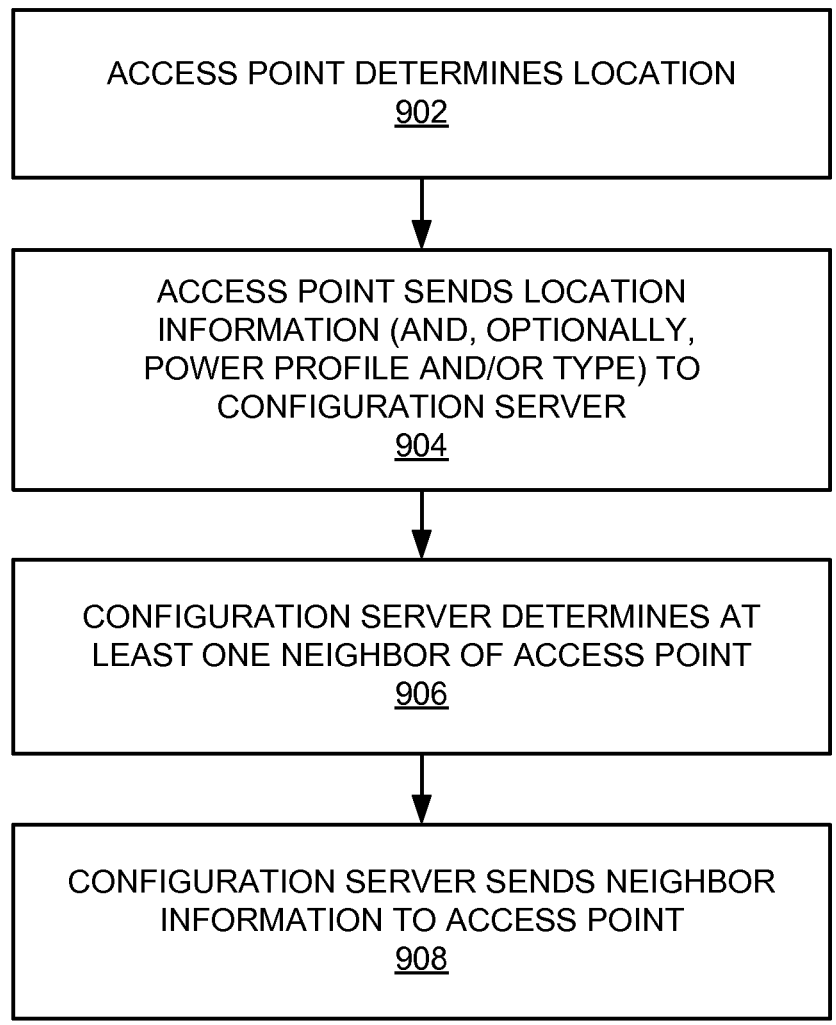
FIG. 9 is a flowchart of several sample aspects of operations that may be performed to configure an access point based on location.
Figure 10:
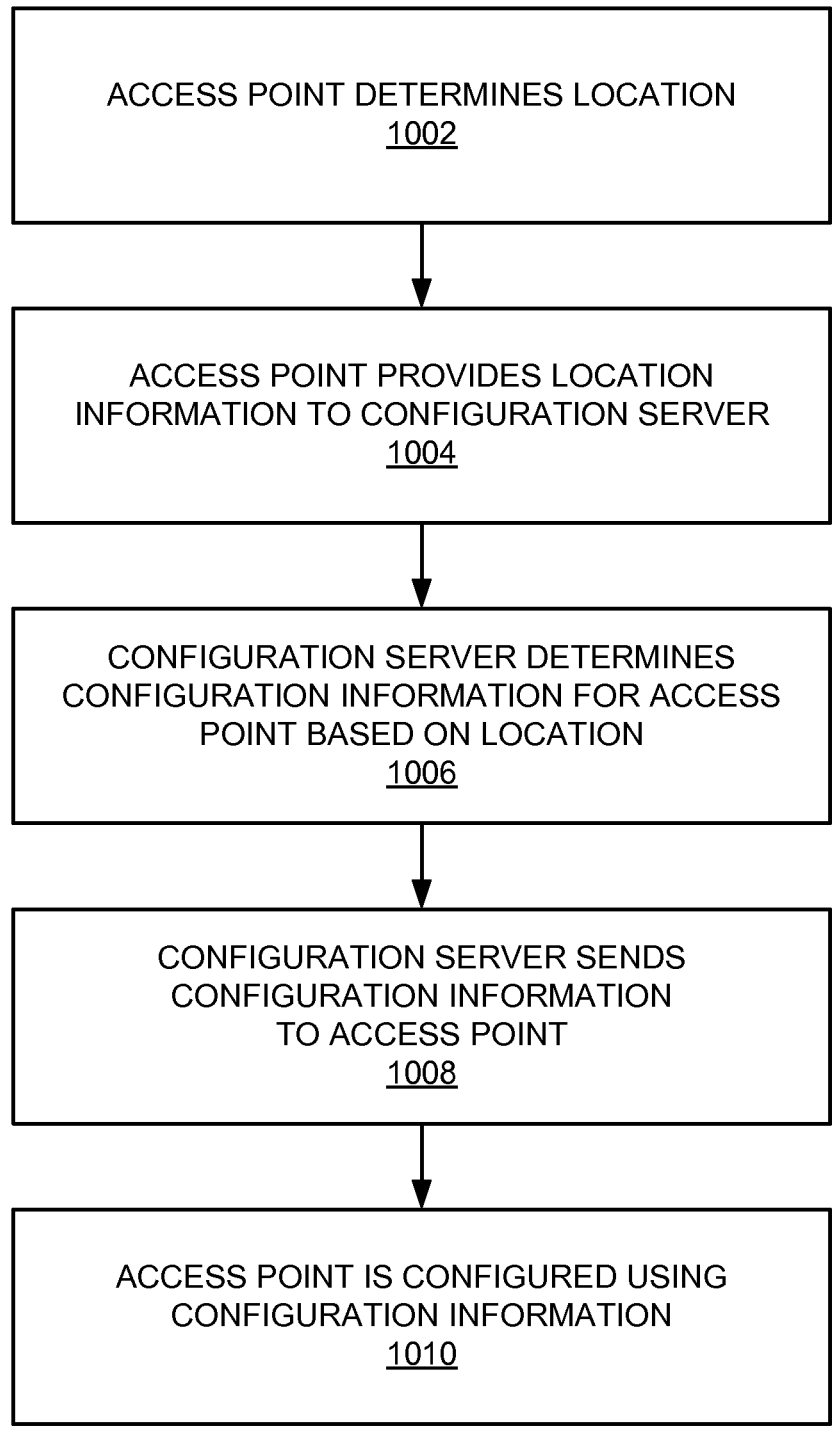
FIG. 10 is a flowchart of several sample aspects of operations that may be performed to configure an access point based on received configuration information.
Figure 11:
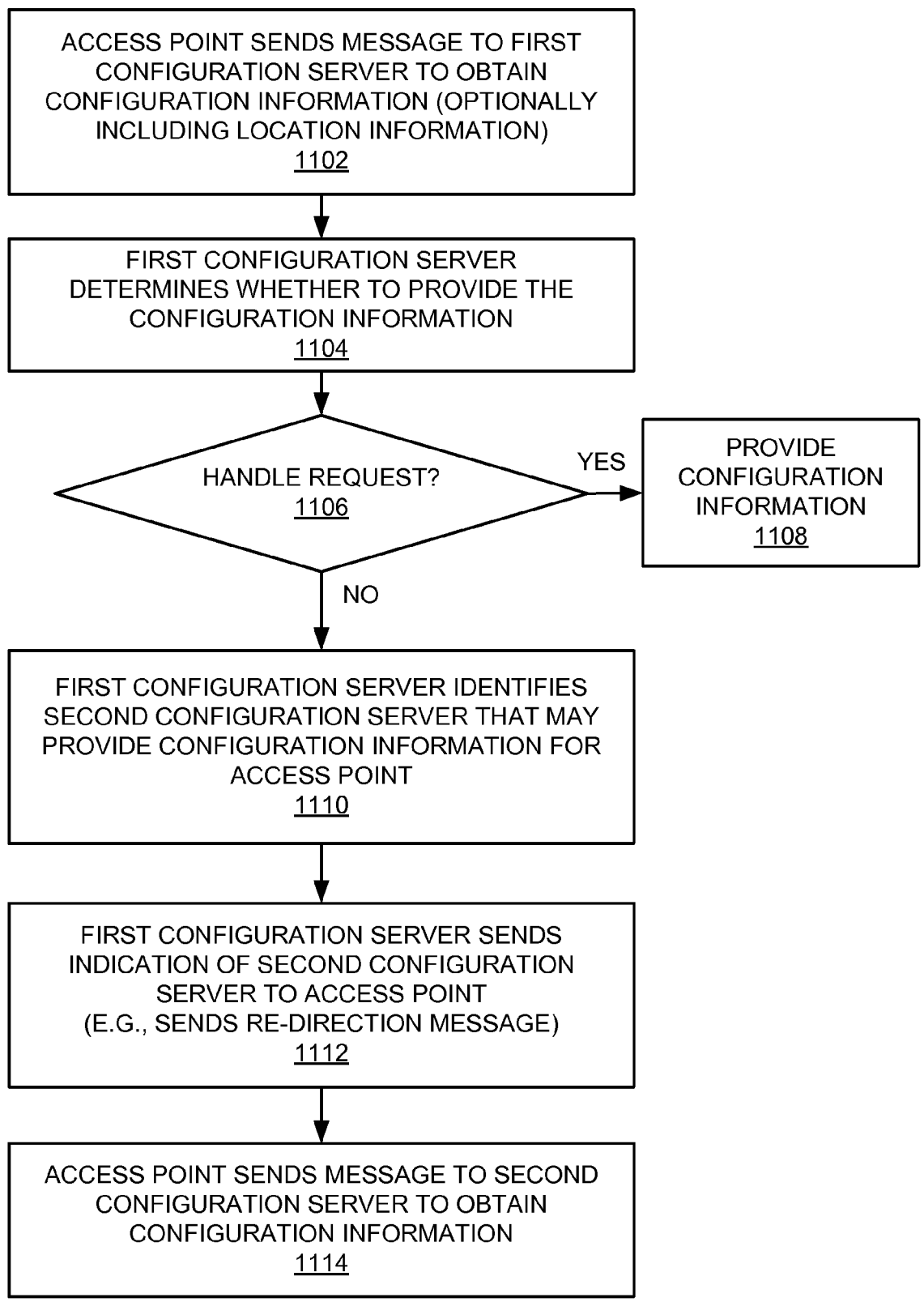
FIG. 11 is a flowchart of several sample aspects of operations that may be performed to direct an access point to a configuration server.

As indicated by the small cells in the macro coverage area 204A, a large number of access points such as femto nodes may deployed in a network. In such a case, the teachings herein may be advantageously employed to configure these access points. With the above overview in mind, various techniques that may be employed to configure access points in accordance with the teachings herein will be described with reference to FIGS. 3-11. FIGS. 3-6 relate in some aspect to operations and components that may be employed to determine a pilot identifier to be used by an access point. FIGS. 7-9 relate in some aspect to operations and components that may be employed to configure an access point based on the configuration of at least one other node. FIG. 10 relates in some aspect to operations that may be employed to provide configuration information to an access point. FIG. 11 relates in some aspect to operations that may be employed to direct an access point to a configuration server.

For illustration purposes, the operations of FIGS. 3, 5-7, and 9-11 (or any other operations discussed or taught herein) may be described as being performed by specific components (e.g., components of the system 100, the components shown in FIG. 4, or the components shown in FIG. 8). It should be appreciated, however, that these operations may be performed by other types of components and may be performed using a different number of components. It also should be appreciated that one or more of the operations described herein may not be employed in a given implementation.

FIGS. 4 and 8 illustrate several sample components that may be incorporated into nodes such as an access point, a network node, and an access terminal to perform configurations operations as taught herein. The described components also may be incorporated into other nodes in a communication system. For example, other nodes (e.g., other access points) in a system may include components similar to those described for the access point 402 and/or the access point 802 to provide similar functionality.

As shown in FIG. 4, an access point 402 and a network node 404 (e.g., a configuration server) may include transceivers 406 and 408, respectively, for communicating with other nodes. The transceiver 406 includes a transmitter 410 for sending signals (e.g., messages) and a receiver 412 for receiving signals (e.g., including configuration-related information). The transceiver 408 includes a transmitter 414 for sending signals and a receiver 416 for receiving signals. Similarly, an access point 802 and a network node 804 (e.g., a configuration server) as shown in FIG. 8 may respectively include a transceiver 806 (including a transmitter 808 and a receiver 810) and a transceiver 812 (including a transmitter 814 and a receiver 816). Also, an access terminal 818 as shown in FIG. 8 may include a transceiver 820 (including a transmitter 822 and a receiver 824).

The nodes of FIGS. 4 and 8 also include other components that may be used in conjunction with configuration operations as taught herein. For example, as shown in FIG. 8, the access point 802, the network node 804, and the access terminal 818 may include communication controllers 826, 828, and 830, respectively, for managing communication with other nodes (e.g., sending and receiving messages/indications) and for providing other related functionality as taught herein. Also as shown in FIG. 8, one or more of the access point 802, the network node 804, and the access terminal 818 may include configuration controllers 832 (e.g., comprising an integration reference point agent, IRPAgent), 834 (e.g., comprising an integration reference point manager, IRPManager), and 836, respectively, for performing configuration-related operations and for providing other related functionality as taught herein. Sample operations of the other components of FIGS. 4 and 8 are described below.

For convenience, the nodes of FIGS. 4 and 8 are depicted as including components that may be used in the various examples described below in conjunction with FIGS. 3-11. In practice, one or more of the illustrated components may not be used in a given example. As an example, in some implementations the access terminal 818 may not include a conflict detector 838 and/or the configuration controller 836. As another example, in some implementations the network node 804 may not include one or more of the configuration controller 834, a neighbor determiner 840, or a configuration server selector 842. As yet another example, in some implementations the access point 802 may not include a location determiner 844.

Also, a given node may contain one or more of the described components. For example, a node may contain multiple transceiver components that enable the node to concurrently operate on multiple frequencies and/or enable the node to communicate via different types of technology (e.g., wired and/or wireless technology).

Figure 3:
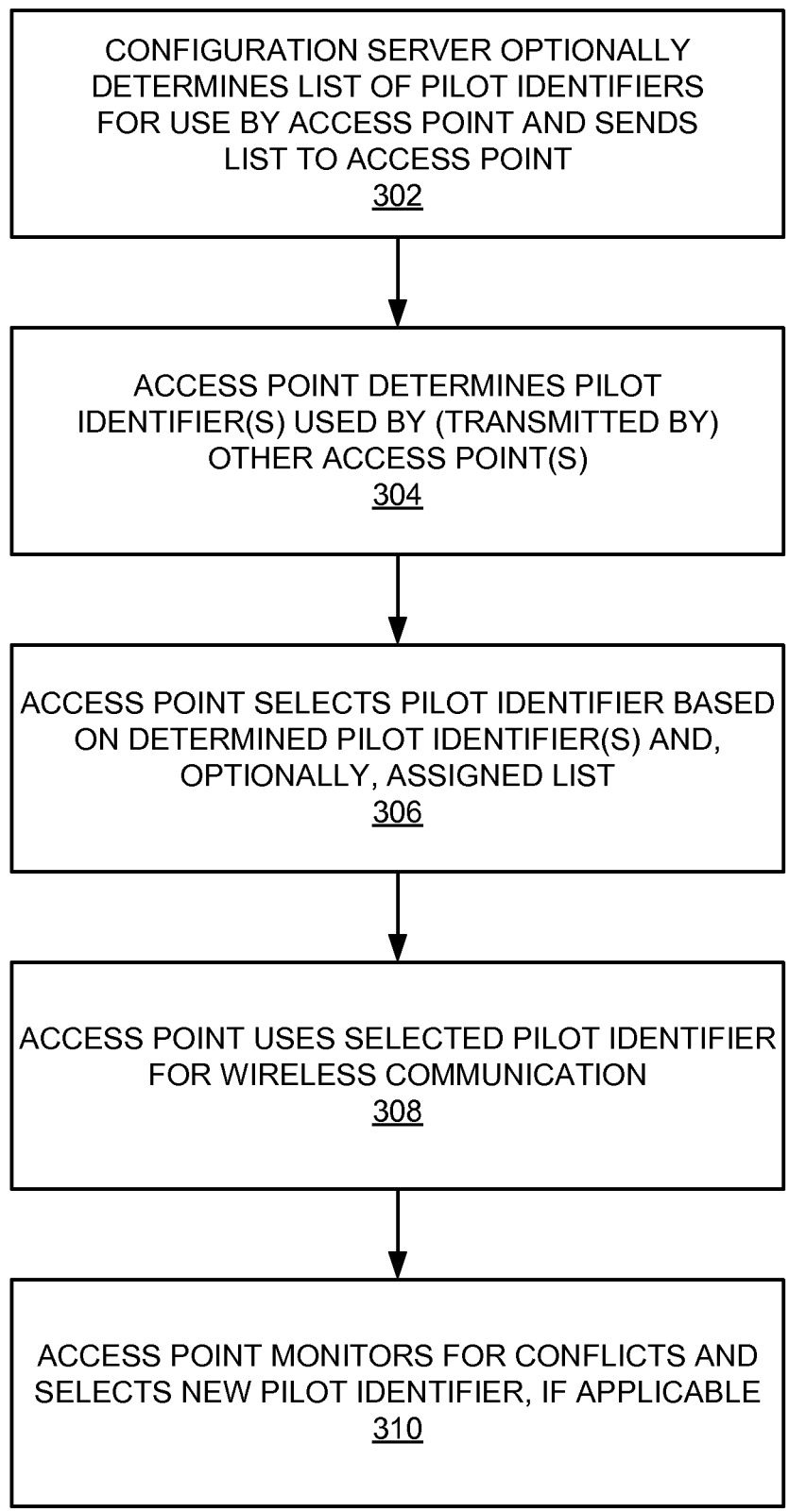
FIG. 3 is a flowchart of several sample aspects of operations that may be performed to configure an access point.

Referring now to FIGS. 3 and 4, the teachings herein may be employed to configure an access point with a pilot identifier based on the pilot identifier(s) used by at least one other access point. Through the use of such a scheme, access points in a network may choose (e.g., autonomously choose) pilot identifiers in a distributed manner. In this way, the possibility of pilot identifier collisions in the network (e.g., when a node hears multiple access points broadcasting the same pilot identifier) may be reduced or eliminated. Moreover, this may be accomplished without the use of a centralized manager that assigns and keeps track of all of the pilot identifiers used by all of the access points in the network.

A pilot identifier may take various forms and may be referred to using different terminology in different implementations. For example, a pilot identifier may be referred to as a cell identifier ("cell ID"), a physical cell identifier ("PCI"), or primary scrambling sequence ("PSC"). Also, a pilot identifier may be associated with a pseudorandom noise sequence ("PN sequence") that is present in a pilot signal.

As represented by block 302 of FIG. 3, in some implementations a configuration server (e.g., the network node 404 of FIG. 4) determines a list of pilot identifiers that may be used by a given access point (e.g., the access point 402) and sends the list to the access point. In the example of FIG. 4, these operations may be performed by a configuration controller 418.

Here, the list of pilot identifiers may comprise a subset (e.g., 10 pilot identifiers) of a set of all the pilot identifiers (e.g., 512 pilot identifiers) defined for a given network. In some implementations the list comprises a range of pilot identifiers.

The list of pilot identifiers may be operator configurable. In some cases, a given list may be applicable throughout the operator's network (e.g., multiple access points in a network may be assigned the same list). In some cases, unique lists may be defined for different access points. For example, each access point in a network may be assigned its own list (all of these lists may not be unique, however).

In some implementations the operator may divide the pilot identifier space into different subsets. The pilot identifier space may be divided based on various criteria.

In some implementations the pilot identifier space is divided into different subsets for different types of access points. For example, macro access points may be assigned a first subset of pilot identifiers (e.g., pilot identifiers 0-49), femto nodes may be assigned a second subset of pilot identifiers (e.g., pilot identifiers 50-499), and mobile access points may be assigned a third subset of pilot identifiers s (e.g., pilot identifiers 500-511).

In some implementations the pilot identifier space is divided into different subsets based on the transmit power of access points. For example, higher-power access points (e.g., macro access points) may be assigned a first subset of pilot identifiers and a lower-power access points (e.g., femto nodes, pico nodes, or relay nodes) may be assigned a second subset of pilot identifiers.

In some implementations the pilot identifier space may be divided into different subsets based on location. For example, different pilot identifier subsets may be defined for different geographic regions. Thus, the subset of pilot identifiers assigned to a given access point may be dependent on the location of the access point.

In view of the above, in some implementations the operations of the configuration server at block 302 may be based on information the configuration server receives from the access point 402. For example, at some point in time (e.g., once the access point 402 establishes an Internet connection), the access point 402 uses its network connectivity to contact the network node 404 and send this information.

The access point 402 (e.g., a location determiner 420) may determine information indicative of the location of the access point 402 and send this information to the network node 404. Such information may take various forms. For example, information indicative of location of an access point may indicate at least one of: a city within which the access point is located, a state within which the access point is located, a country within which the access point is located, a macro access point that serves the access point, a zone with which the access point is associated, a cell with which the access point is communicating, a network identity or operator that the cell is associated with, GPS coordinates, a geographic location, or a street address.

In addition, or in the alternative, the access point 402 may send information indicative of the type of the access point 402 to the network node 404. As discussed above, this information may take various forms. For example, this type information may indicate one or more of a device class (e.g., femto, macro, mobile, etc.) of the access point 402, a power class (e.g., high power, low power, etc.) of the access point 402, whether the access point is restricted (e.g., as taught herein), whether the access point is stationary or mobile, or some other characteristic(s) associated with the access point 402.

The network node 404 (e.g., the configuration controller 418) may then determine the list of pilot identifiers for use by the access point 402 based on the information it receives from the access point 402. In some aspects, the network node 404 may use pilot identifier ranges pre-provisioned by the operator to select a valid range of pilot identifiers for use by the indicated node type and/or for use at the indicated location.

As mentioned above, some or all of the operations of block 302 may not be utilized in some implementations. For example, in some cases the pilot identifier lists (e.g., ranges) are standardized. In such a case, the network node 404 may simply send a standard pilot identifier list to the access point 402. Alternatively, the access point 402 may be configured with the pilot identifier list, whereby the access point 402 does not receive this information from the network node 404.

As represented by block 304 of FIG. 3, the access point 402 (e.g., a pilot identifier determiner 422) determines at least one pilot identifier that is used by at least one other access point. For example, the access point 402 may determine which pilot identifiers are being used by its neighbors.

In some implementations the access point 402 (e.g., a neighbor discovery controller 424) may conduct neighbor discovery to identify its neighbors. As will be discussed in more detail below, the access point 402 may discover one-hop neighbors or multi-hop neighbors (e.g., two-hop, three-hop, etc.). In the latter case, the access point 402 may elect to crawl two or three hops or more to obtain pilot identifier information from more distant neighbors.

In some implementations the access point 402 acquires configuration information from its neighbors via neighbor discovery. For example, as a result of a neighbor discovery request issued by the neighbor discovery controller 424, the access point 402 may receive a neighbor discovery response from a neighbor access point (e.g., a one-hop or multi-hop neighbor) that includes the pilot identifier used by that neighbor access point. Such a neighbor discovery operation may be performed, for example, via a backhaul.

In some implementations the access point 402 may acquire the pilot identifier information of its neighbors from a server (e.g., network node 404). For example, the network node 404 (e.g., a neighbor determiner 426) may maintain this information on its own or obtain this information upon request. The network node 404 may then send the pilot identifier information to the access point 402 in response to a request from the access point 402. In some aspects, the network node 404 may identify the pilot identifier information to be provided based on the location of the access point 402. For example, in its request, the access point 402 may include information that is indicative of its location. The network node 404 may then identify the access points in that vicinity and determine which pilot identifiers they use. In addition, the network node 404 may take into account the transmit power of these access points when determining whether pilot signals transmitted by these access points may be received by a node that also receives pilot signals from the access point 402. In this way, only those pilot identifiers that may potentially cause a pilot identifier collision may be sent to the access point 402.

In some implementations the access point 402 may initially acquire a list of its neighbors and then conduct neighbor discovery on the access points identified by the list. For example, the network node 404 (e.g., the neighbor determiner 426) may send such a list to the access point 402 based on the location of the access point 402 (e.g., which may be provided to the network node 404 by the access point 402). Also, an access terminal that is associated with (e.g., served by) the access point 402 may send a report to the access point 402 that indicates which access points the access terminal currently hears (i.e., receives signals from) or has previously heard.

In some implementations the access point 402 may determine the pilot identifiers used by its neighbors without conducting formal neighbor discovery. For example, the access point 402 may include a downlink receiver (e.g., as represented by receiver 412) that is configured to detect pilot signals from neighboring access points. That is, the access point 402 may receive configuration information over-the-air. In this case, the access point 402 may determine the pilot identifiers used by these neighboring access points based on detected signals (e.g., based on the PN sequence derived from received pilot signals) and, optionally, determine the identify of the neighbors (e.g., by analyzing information in other downlink messages).

In some implementations the access point 402 may receive pilot identifier or other neighbor information from an access terminal (e.g., access terminal 102 of FIG. 1). For example, an access terminal that is associated with the access point 402 may send a report to the access point 402 indicative of the pilot signals that the access terminal is receiving. Here, the access terminal may derive information (e.g., a pilot identifier, a PN sequence, or other access point identity information) from the signals it receives and forward this information to the access point 402.

As represented by block 306 of FIG. 3, the access point 402 (e.g., a pilot identifier selector 428) selects a pilot identifier to be used by the access point 402 based on the pilot identifiers determined by block 304 and a designated pilot identifier list, if applicable. For example, the access point 402 may select a pilot identifier from the designated list that does not conflict with (e.g., is not the same as) any pilot identifier used by the neighboring access points.

The access point 402 may attempt to avoid conflict with the pilot identifiers of its immediate neighbors (e.g., one-hop neighbors) and, optionally, multi-hop neighbors. Multi-hop neighbor discovery is discussed in more detail below in conjunction with FIGS. 5 and 6.

The access point 402 may organize the pilot identifiers of its neighbors in several groups and use these groups in the pilot identifier selection process. Such groups may be organized in various ways. For example, a first group may include pilot identifiers heard by the access point 402 and/or the pilot identifiers reported by access terminals associated with the access point 402. A second group may include the second-hop neighbors identified during neighbor discovery, but only those that were identified via neighbor lists provided by neighboring femto nodes (e.g. a low-power access points). A third group may include the second-hop neighbors identified during neighbor discovery, but only those that were identified via neighbor lists provided by neighboring macro access points (e.g. a high-power access points). Here, the differentiation between groups two and three may be employed because a neighboring macro access point may report a large number of femto node neighbors, most of which may be located relatively far away from the access point 402 and are, therefore, less likely to cause a conflict with the pilot identifier used by the access point 402.

Continuing with the above example, in the event one of the pilot identifiers in a designated list is not being used by any of the neighbors of the access point 402 (e.g., any of the identifiers of groups one, two, and three), the access point 402 may simply select this pilot identifier. Conversely, if all of the pilot identifiers in the designated set are being used by at least one of the neighbors, the access point 402 may determine whether any of the pilot identifiers of the designated set in only in conflict with an access point from group three (i.e., there is no conflict with group one or group two). If so, the access point 402 may select one of these pilot identifiers in an attempt to minimize the risk of a conflict. In the event all of the pilot identifiers of the designated list conflict with either group one or group two, the access point 402 may select a pilot identifier that only conflicts with group two (in the event such a pilot identifier exist). In some implementations, the access point 402 is not allowed to select a pilot identifier from group one. In the event there are multiple pilot identifiers to choose from, the access point 402 may select one of the pilot identifiers randomly or in some other designated manner.

As represented by block 308, the access point 402 is then configured to use the selected pilot identifier for wireless communication. For example, the transmitter 410 may use the selected pilot identifier to generate the pilot signals that it broadcasts.

As represented by block 310, the access point 402 may continue to monitor the pilot identifiers used by its neighbors (e.g., using the operations of block 304) so that the access point may continue to ensure that the pilot identifier it is using is not in conflict with the pilot identifier used by a neighbor. For example, such a conflict may be caused by a new access point that has been recently installed in the vicinity of the access point 402 or by a mobile access point that has entered the vicinity of the access point 402. Also, a pilot identifier conflict (e.g., collision) may occur if two access points that are not within hearing range of each other choose the same a pilot identifier. Such a conflict may eventually be detected, for example, by an access terminal that receives signals from both of the access points. In such a case, one or both of the access points may be configured to change their pilot identifier. As described below in conjunction with FIG. 7, an access terminal that detects a conflict may inform one or all of the concerned access points. For example, the access terminal may connect to one of these access points to pass on this information, or may send this information to the concerned access points using a connection the access terminal has to another access point.

In the event a conflict is identified, the access point 402 may perform operations similar to those described above to select a new pilot identifier that does not conflict with any pilot identifier used by any neighboring access point. Thus, through the use of these techniques, the access point 402 may independently recover from pilot identifier conflicts (e.g., pilot identifier collisions). For example, upon receiving a conflict notification or identifying a conflict, the access point 402 may move its current pilot identifier into a group of identifiers that are designated as forbidden (e.g., group one discussed above) and repeat the operations described above.

In some cases, when changing its pilot identifier, the access point 402 may drop all connections that it currently holds and force the associated access terminals to reconnect. As an optimization, the access point 402 may send a message ahead of time to inform the access terminals of the new pilot identifier and the time at which the access point 402 will switch to using a new pilot identifier. In this way, the switch to the new pilot identifier may be achieved with minimal disruption of service.

Figure 5:
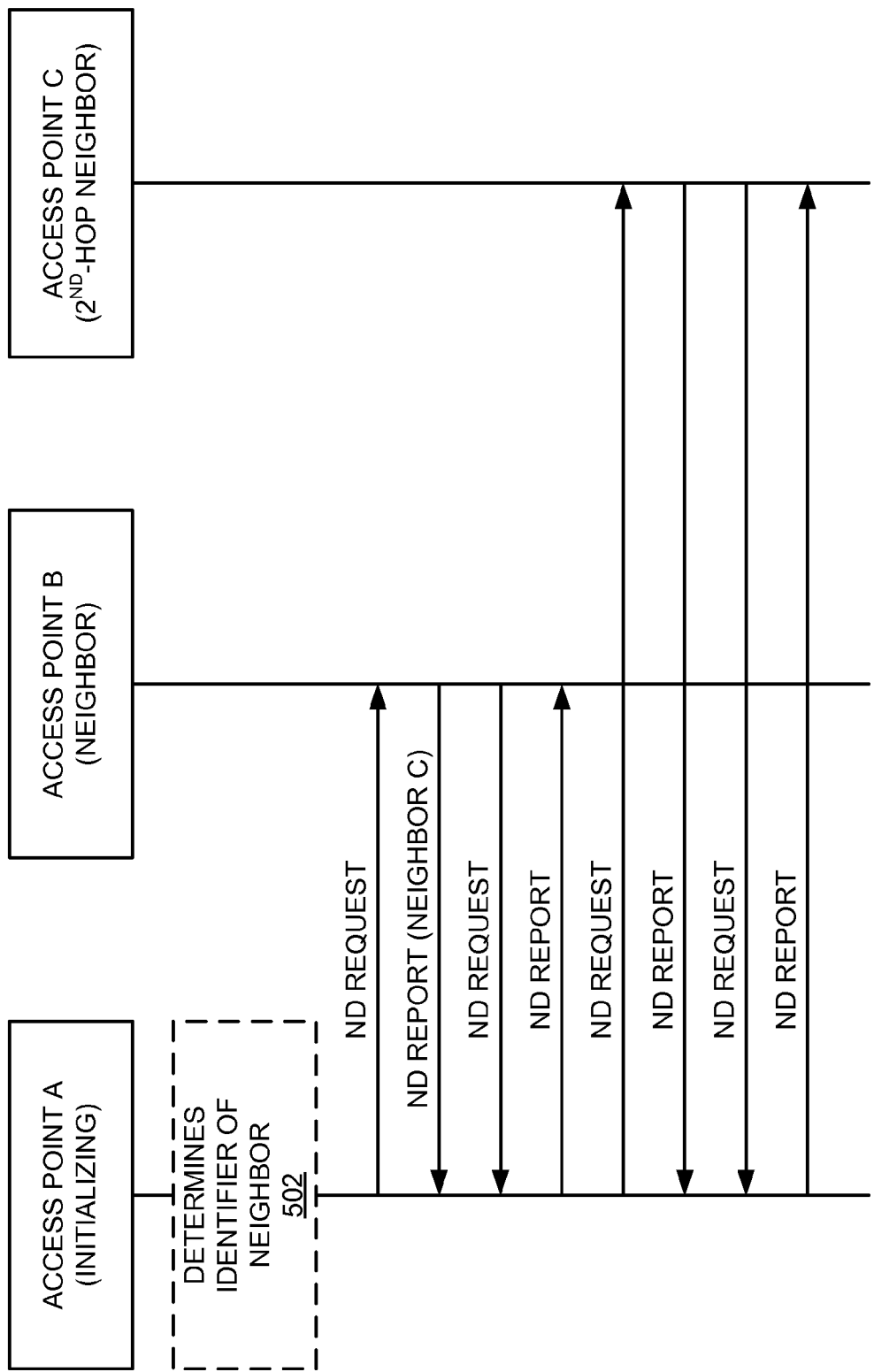
FIG. 5 is a simplified diagram illustrating sample operations relating to neighbor discovery.
Figure 6:
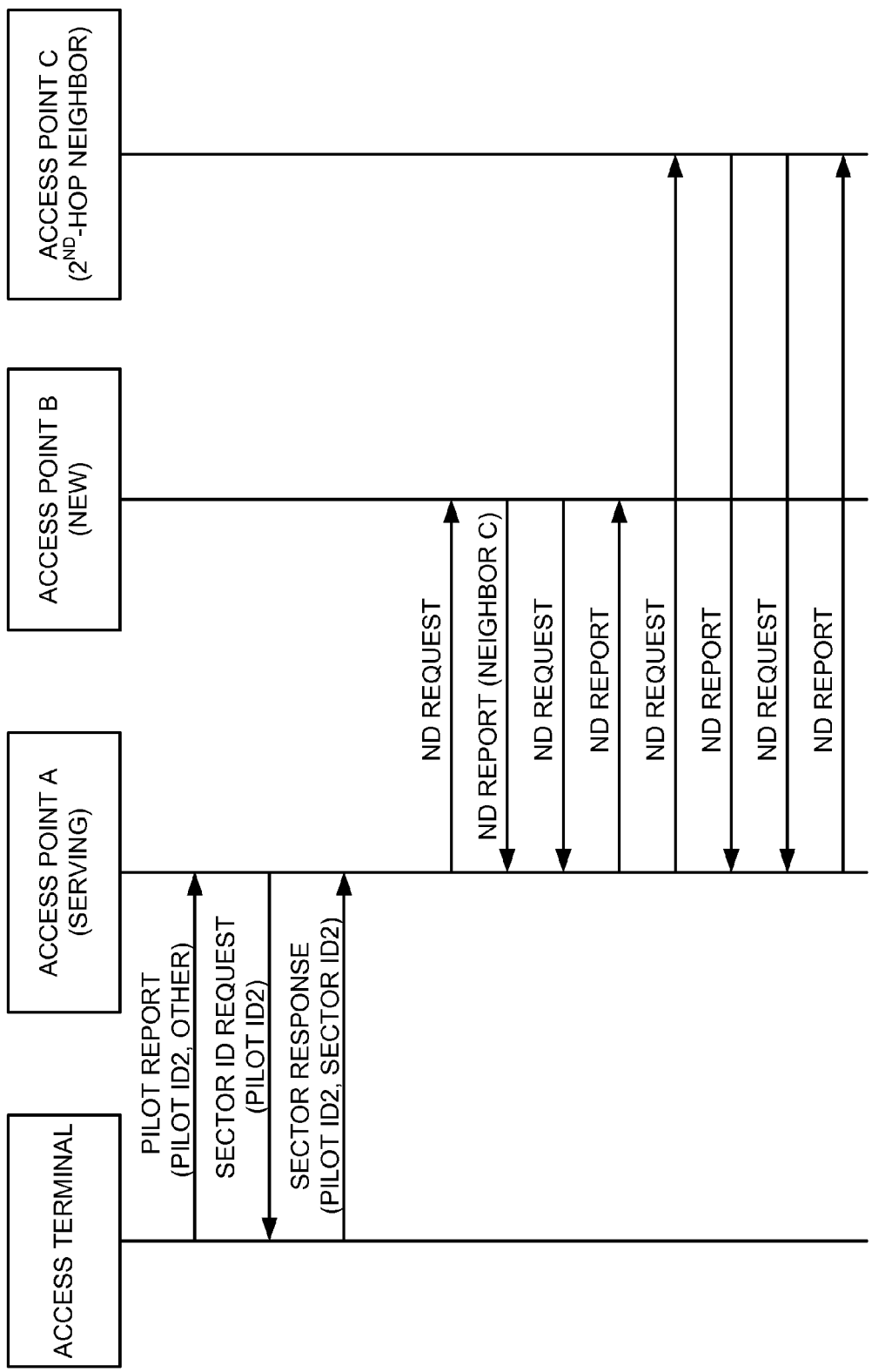
FIG. 6 is a simplified diagram illustrating sample operations relating to neighbor discovery.
Figure 7:
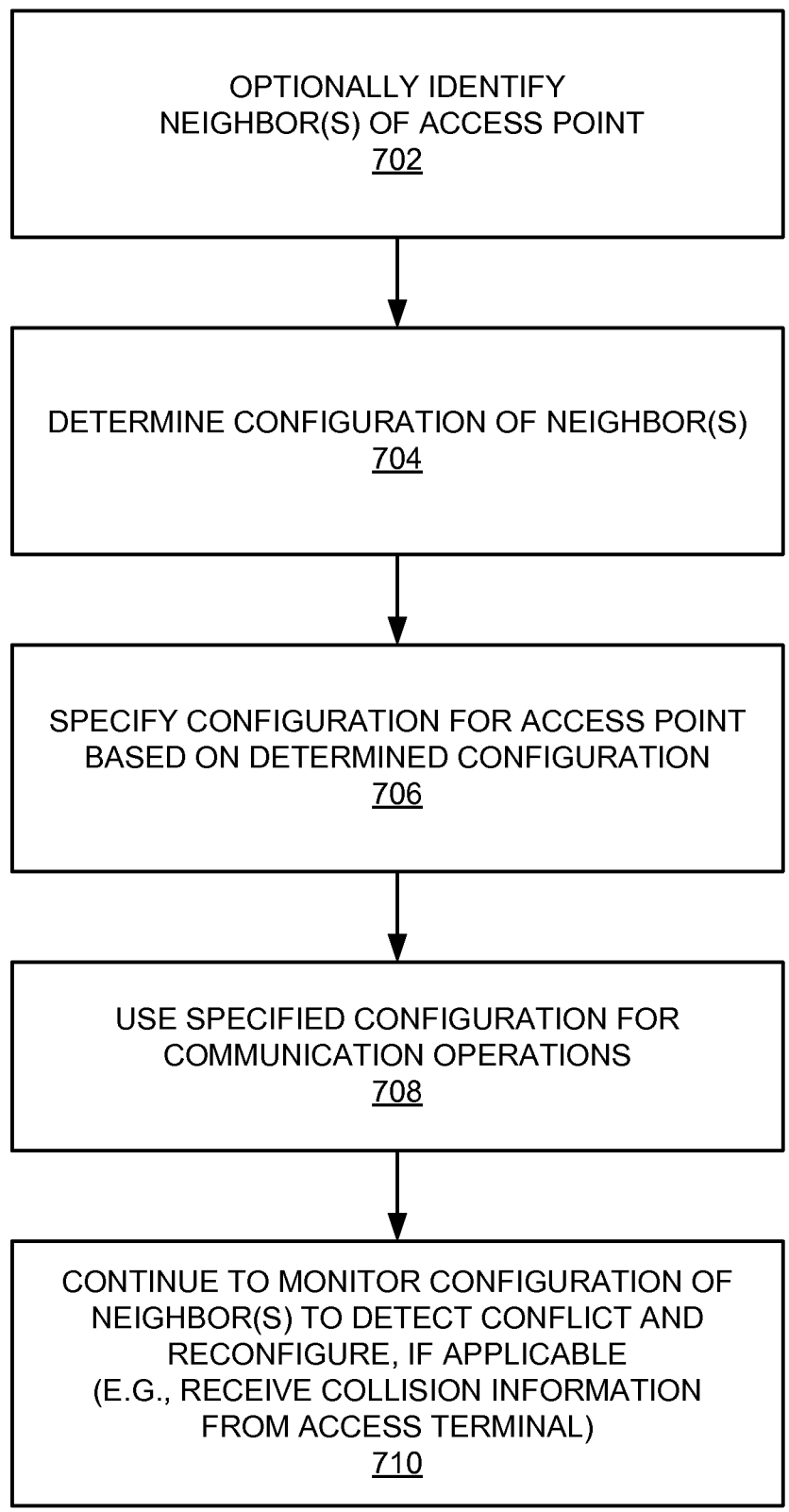
FIG. 7 is a flowchart of several sample aspects of operations that may be performed to configure an access point based on the configuration of one or more neighboring nodes.

Referring now to FIGS. 5 and 6, an access point may discover its neighbors through the use of access point-initiated neighbor discovery and/or access terminal-assisted neighbor discovery. FIG. 5 represents an example of access point-initiated neighbor discovery. FIG. 6 represents an example of access terminal-assisted neighbor discovery.

In FIG. 5, an access point A may initiate neighbor discovery upon learning about the existence of a neighboring access point B. For example, as discussed above the access point A may listen to the broadcast information of its RF neighbors (e.g., through the use of a downlink receiver) or obtain information about its neighbors in some other manner. As represented by block 502 in FIG. 5, the access point A may thus learn an identifier (e.g., the address) of one of its neighbors.

The access point A (e.g., by operation of a neighbor discovery controller component) may connect to that neighbor directly over the backhaul and perform an exchange of neighbor discovery messages. For example, the access point A sends a neighbor discovery request ("ND Request") to the access point B. In response, the access point B (e.g., by operation of a neighbor discovery controller component) sends a neighbor discovery report ("ND Report") to the access point A. Similarly, the access point B sends a neighbor discovery request to the access point A and receives a neighbor discovery report in response.

Advantageously, the report from the access point B may include information about its neighbors (e.g., an access point C). For example, the information regarding the access point C may comprise sufficient information (e.g., an identifier, an address, etc.) to enable another node to access the access point C. Here, it should be appreciated that the access point C may be a second-hop (or higher-hop) neighbor to the access point A (e.g., the access point A cannot hear the access point C). In some implementations the access point B may automatically include information about its neighbors in its report. Alternatively, the access point A may specifically request that the access point B include this information in the report.

The access point A may therefore use any information it receives from a first-hop neighbor (e.g., access point B) regarding any multi-hop neighbors to communicate with the multi-hop neighbors. For example, as indicated in FIG. 5, the access point A sends a neighbor discovery request to the access point C and receives a neighbor discovery report in response. Likewise, the access point C sends a neighbor discovery report to the access point A and receives a neighbor discovery report in response. In a similar manner as discussed above, the neighbor discovery report from the access point C may include information about neighbors (not shown in FIG. 5) of access point C. In this way, the access point A may obtain information about its third-hop neighbors.

In FIG. 6, an access point A learns information about its neighbors through access terminal-assisted neighbor discovery. Here, the access terminal sends a pilot report to its serving access point (access point A) that indicates all of the pilots that the access terminal is receiving (e.g., pilot ID2 and other pilot IDs). In the event a pilot ID in the pilot report is new to the access point A, the access point A may use the access terminal to resolve the address (e.g., the IP address) of the new access point. For example, the access point A may send a sector ID request or other suitable request (e.g., including the pilot ID of the new access point) to the access terminal. The access terminal may then send a sector response that includes the corresponding sector ID (or the access terminal sends some other suitable response) to the access point A.

The access point A may then perform a neighbor discovery exchange with the new access point (e.g., access point B). As discussed above in conjunction with FIG. 5, the access point A may receive information about second-hop neighbors (e.g., access point C) from the access point B and then conduct a neighbor discovery exchange with the second-hop neighbor(s).

Referring now to FIGS. 7-9, the teachings herein are applicable to the configuration of an access point in general. For example, the techniques described above as well as other techniques described herein may be used to determine a variety of configuration parameters for an access point. Examples of such configuration parameters include, without limitation, a frequency band, a carrier frequency, a pilot identifier, a maximum transmit power, and a transmit power profile.

As represented by block 702 of FIG. 7, the access point 802 (e.g., a neighbor discovery controller 846) may optionally determine the identity of its neighbors. For example, in a similar manner as discussed above the access point 802 may receive a list of its neighbors from a configuration server (e.g., network node 804). Here, an operator may provide one or more centralized configuration servers within its network to assist in the configuration of access points in the network. Once the access point 802 has initialized, it may initiate the configuration process.

In some aspects, initialization of the access point 802 involves the access point 802 acquiring connectivity with the operator's network. Here, the access point 802 may need to be authenticated before is allowed to access an operator's network.

In addition, the access point 802 may locate a configuration server. For example, the access point 802 may be preconfigured with a well-known address (e.g., IP address) of the configuration server. Alternatively, the access point 802 may be aware of the operator of the network to which is connected (e.g., operator.com), such that the access point 802 may make a DNS query for the FQDN "config_server.operator.com" and receive an IP address in return. In other implementations the access point 802 may use some other technique to obtain the appropriate address information. The access point 802 may then establish communication with the configuration server. For example, communication may be established using standardized SNMP or other configuration protocols such as NetConf, OMA DM, CWMP (TR 069), or DOCSIS, or through the use of a proprietary CLI over SSH.

As discussed above, a configuration server may provide a neighbor list to an access point based on location information the configuration server receives from the access point. These operations will be described in more detail with reference to the flowchart of FIG. 9 and the nodes 802 and 804 of FIG. 8.

As represented by block 902 of FIG. 9, after initialization of the access point 802, the location determiner 844 may determine the location of the access point 802. The location determiner 844 may determine location in various ways. For example, location may be determined through the use of global positioning system ("GPS") technology, assisted-GPS technology, a network-based location determining method, an RF-based method, or some other suitable method.

As represented by block 904, the access point 802 sends its location-related information (e.g., an estimate of its location) to the network node 804. In some implementations this operation may be initiated by the access point 802 (e.g., once the access point 802 connects to the configuration server). In some implementations the configuration server may explicitly ask for this location information as part of its connection setup protocol (e.g., via a request). The access point 802 also may send other information (e.g., power profile, node type) to the network node 804 that the network node 804 may use to provide an appropriate response.

As represented by block 906, once the network node 804 (e.g., neighbor determiner 840) receives the location information from the access point 802, the network node 804 identifies the neighbors of the access point 802 and generates a neighbor list. This neighbor list may include, for example, any macro access points that are relatively close to the access point 802, as well as any other access points (e.g., femto nodes, etc.) in the geographical vicinity of the access point 802.

The neighbor list may be a function of the power classes (or power profiles) of the access point 802 and its neighbors. For example, a distant macro access point that transmits with high-power may be a neighbor of the access point 802. In contrast, a low-power access point (e.g., a femto node) that is relatively close to the access point 802 may not be included in the neighbor list if the coverage areas of the low-power access point and the access point 802 do not intersect. Consequently, in some cases the access point 802 may send power class information to the network node 802 along with the location information. In addition, the network node 804 may obtain power-related information from other access points in the network. As represented by block 908, once the neighbor list has been generated, the network node 804 sends the neighbor list to the access point 802.

Referring again to FIG. 7, as represented by block 704, the access point 802 (e.g., the configuration controller 832) determines the configuration of its neighbors. As discussed above, the access point 802 may acquire the configuration information of its neighbors in various ways. For example, the access point 802 may connect directly with a neighbor via a backhaul and thereby read a select set of parameters. The access point 802 may listen over-the-air to discover one or more parameters of the neighboring access point (e.g., a pilot identifier as discussed above). The access point 802 may use access terminal-assisted neighbor discovery, whereby an access terminal associated with the access point 802 may send configuration information to the access point 802. For example, the access terminal 818 (e.g., configuration controller 836) may inform the access point 802 of the neighbor access points that the access terminal 818 has heard. Also, the access point 802 may receive the configuration information of neighbor nodes from a configuration server such as the network node 804 (e.g., configuration controller 834) as discussed herein. It should be appreciated that the access point 102 may obtain configuration information through the use of one or more of the techniques described herein or through the use of other techniques.

As represented by block 706, the access point 802 (e.g., a configuration determiner 848) may specify a configuration for the access point 802 based on the configuration information obtained at block 704. In some aspects, the access point 802 may autonomously choose its own set of parameters (e.g., RF parameters) as a function of the parameters (e.g., RF parameters) of its neighbors.

In some cases the access point 802 may select its power profile based on the power profile or power profiles of its neighbors. For example, the access point 802 may select the same power profile that is used by its neighbors. Alternatively, the access point 802 may select a power profile that is complementary to the power profile(s) used by its neighbor(s). A power profile may define, for example, a maximum transmit power, different transmit powers for different conditions, or other power parameters.

As discussed above, in some cases the access point 802 may select a pilot identifier (e.g., a pilotPN) based on the pilot identifiers used by its neighbors. For example, the access point 802 may select a different pilot identifier than its neighbors.

In some cases the access point 802 may select a carrier (e.g., an RF frequency band) based on the carrier(s) used by its neighbors. For example, neighboring nodes in a network may select complementary sets of carrier priorities (e.g., as indicated by a carrier mask or some other suitable indication) in order to implement an interference management scheme. Here, each access point may radiate more energy on some carriers and less energy (e.g., or none at all) on other carriers. If neighboring access points choose these carrier priorities in a complementary fashion, it may ensure that access terminals associated with each of the access points may have more favorable interference environments, at least on some of the carriers. To accomplish this in an autonomous manner, a new access point (e.g., an access point that has recently been initialized) may determine the carrier priorities used by its neighbors and choose its own carrier priorities to be as complementary to them as possible.

In some aspects, the configuration of the access point 802 may be dependent on its location. For example, a configuration server (e.g., the configuration controller 834) may specify a list (e.g., subset) of parameters (e.g., an allowed parameter range) that may be used by the access point. As discussed above in conjunction with FIG. 3, the specified list may be based on the location of the access point 802. For example, a particular list of power profiles that may be used by the access point 802 may be specified based on the location of the access point 802. Similarly, a particular list of frequency bands that may be used by the access point 802 may be specified based on the location of the access point 802. At a broad level, the city, state, or country in which the access point 802 currently resides may limit which frequency band the access point 802 may use. For example, the same operator may own different frequency bands in different countries or an operator may designate the use of different frequency bands in different cities.

In some implementations configuration information may include certain optimization parameters (e.g., non-radio parameters). Such parameters may include, for example, security keys that may be used to gain access to one or more services (e.g., network connectivity). Such parameters also may include the addresses of other nodes to which the access point 802 may need to connect.

As represented by block 708 of FIG. 7, the access point 802 may then use the configuration specified at block 706 for communication or other operations. For example, as discussed above transceiver 806 be configured with the determined RF parameters to determine which pilot identifier to advertise, which carriers to operate on, and the transmit power level to be used on these carriers.

As represented by block 710, the access point 802 may continue to monitor the configurations of its neighbors to detect a conflict (e.g., a collision). As mentioned above, in the event of a conflict, the access point 802 may perform configuration operations as described above to resolve the conflict.

In some implementations, the access point 802 may receive an indication of the conflict from an access terminal (e.g., access terminal 818). For example, if the access terminal 818 detects a conflict (e.g., conflict detector 838 detects two access points using the same pilot identifier), the access terminal 818 may send a corresponding message to the access point 802. Based on this message, the configuration controller 802 may perform operations as discussed above to select a different configuration for the access point 802.

It should be appreciated that the operations and components described above conjunction with FIGS. 7-9 may be applicable to the configuration schemes described herein with reference to other figures. For example, these operations and components may be used in conjunction with configuring a pilot identifier for an access point (e.g., as described above in conjunction with FIGS. 3-6).

Referring now to FIGS. 10 and 11, in some implementations an access point may obtain configuration information from another node (e.g., a configuration server), whereby the configuration information is dependent on the location of the access point. For convenience, the operations of FIGS. 10 and 11 will be described in the context of the access point 802 and the network node 804 of FIG. 8.

As represented by blocks 1002 and 1004 of FIG. 10, the access point 802 (e.g., location determiner 844) determines its location and provides this information to the network node 804. This operation may thus be similar to the location determining operations described above (e.g., at blocks 902 and 904).

As represented by block 1006, the network node 804 (e.g., configuration controller 834) determines configuration information for the access point 802 based on the received location information. For example, as discussed above, configuration information may comprise RF parameters, optimization parameters, other parameters, or a combination of two or more of these parameters. In some cases this operation may result in an entirely new configuration being defined for the access point 802. Alternatively, the network node 804 may only define a portion of the parameters used by the access point 802.

As represented by block 1008, the network node 804 sends the configuration information to the access point 802. The access point 802 is then configured to use the received configuration information (block 1010).

Referring now to FIG. 11, in some cases a configuration server may elect to redirect an access point to a different configuration server. Such a determination may be made, for example, based on the location of the access point and/or the load on a configuration server.

As represented by block 1102, the access point 802 sends a message to the network node 804 to obtain configuration information. As discussed above, such a message may include information indicative of the location of the access point 802.

As represented by block 1104, the network node 804 (e.g., the configuration server selector 842) may determine whether to provide the requested configuration information. For example, the network node 804 may determine, based on the location of the access point 802, that another configuration server (e.g., that is closer to the access point 802) should handle the request. Also, the network node 804 may elect to redirect a request based on the load at the network node 804. For example, if the network node 804 is heavily loaded, the network node 804 may redirect the request to another configuration server that is not as heavily loaded.

As represented by blocks 1106 and 1108, in the event the network node 804 decides to handle the request, the network node 804 may provide the requested configuration information to the access point 802. For example, this operation may be similar to the operations described above in conjunction with FIG. 10.

As represented by block 1110, if the network node 804 decides it will not handle the request (e.g., based on its load or the proximity of the access point 802), the network node 804 (e.g., the configuration server selector 842) identifies another configuration server that may provide configuration information for the access point 802. To this end, the network node 804 may maintain a database that includes information about other configuration servers on the network. In addition or alternatively, the network node 804 may be configured, conduct discovery, or communicate with another node to obtain this information.

As represented by block 1112, the network node 804 sends an indication of the other configuration server to the access point 802 (e.g., in the form of a redirection message). In some implementations the indication may comprise information that will enable the access point 802 to determine the address of the other configuration server. For example, the indication may comprise a location (e.g., a city) of the configuration server. Upon receipt of this information, the access point 802 may determine the address of the other configuration server (e.g., via DNS query).

In some implementations the indication may comprise the address of the other configuration server. In some implementations redirection may be achieved by the configuration server setting a parameter that indicates the address of the different configuration server. Upon determining that there is then a change in this parameter, the access point 802 will attempt to establish a connection with the new configuration server.

As represented by block 1114, the access point 802 may therefore send a message to the other configuration server to obtain configuration information. Once the access point 802 completes its configuration exchange with a configuration server, the access point 802 may commence user communication operations.

Figure 12:
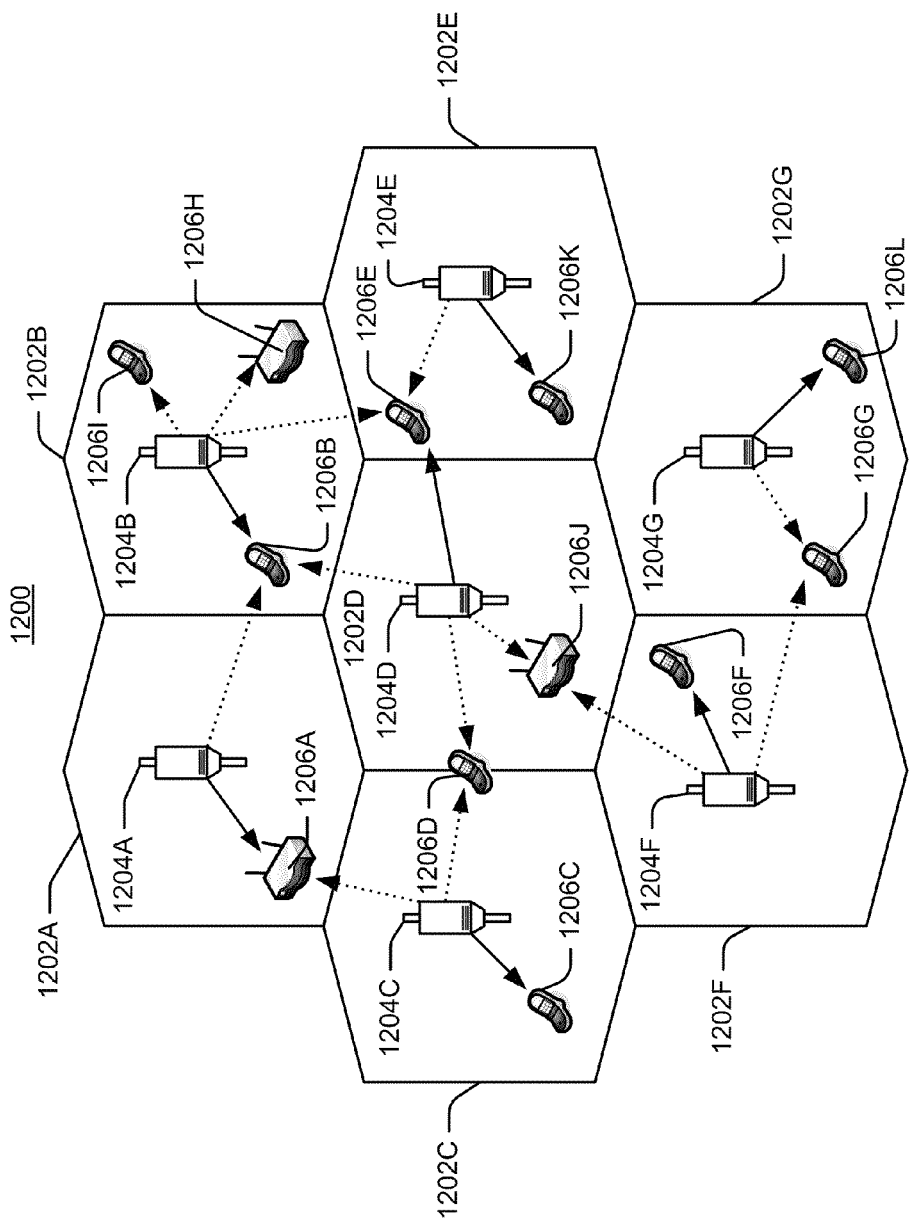
FIG. 12 is a simplified diagram of a wireless communication system.
Figure 13:
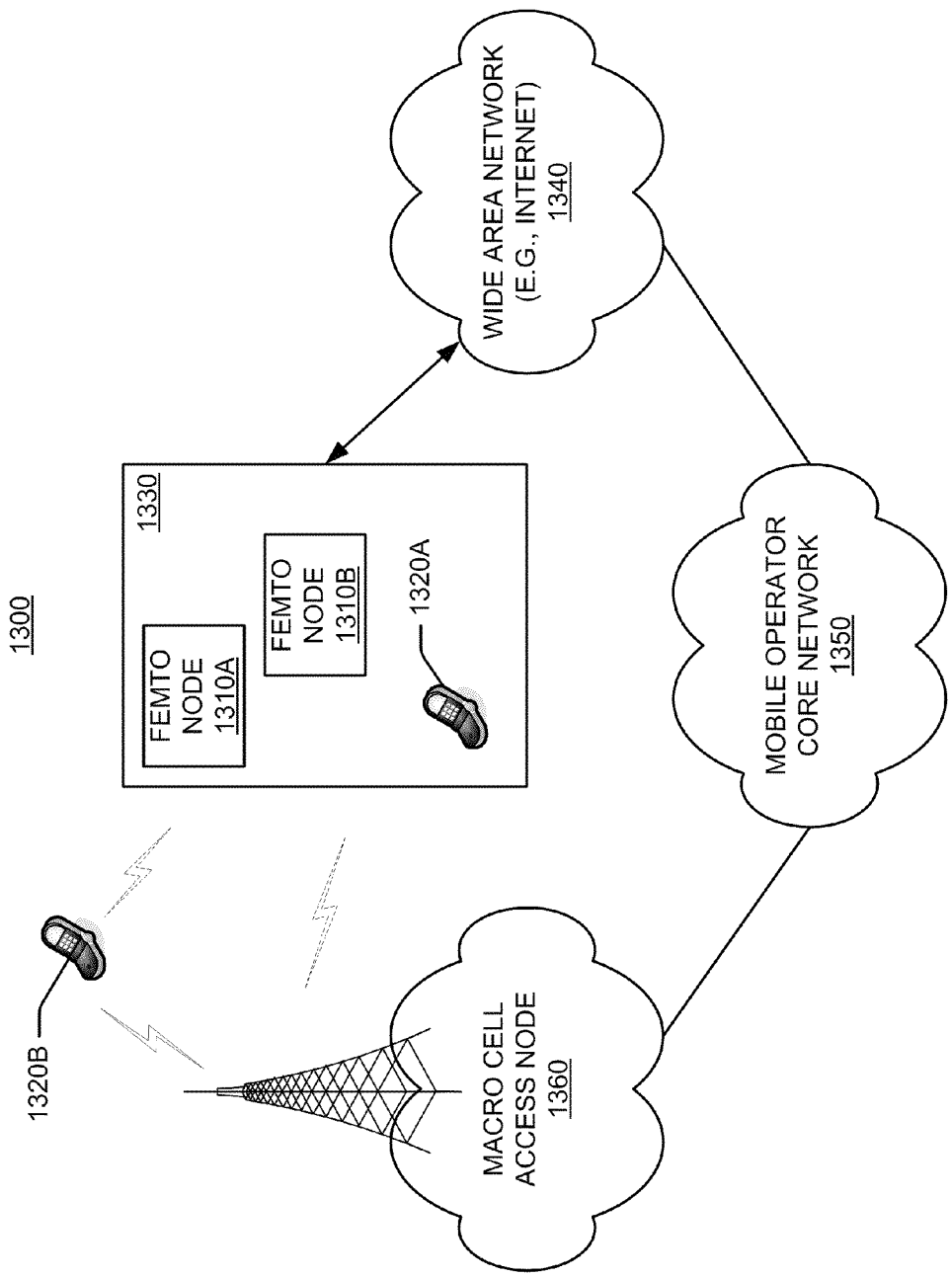
FIG. 13 is a simplified diagram of a wireless communication system including femto nodes.

As mentioned above, the teaching herein may be implemented in network that employs macro access points, femto nodes, relay nodes, and so on. FIGS. 12 and 13 illustrate examples how access points may be deployed in such a network. FIG. 12 illustrates, in a simplified manner, how the cells 1202 (e.g., macro cells 1202A-1202G) of a wireless communication system 1200 may serviced by corresponding access points 1204 (e.g., access points 1204A-1204G). Here, the macro cells 1202 may correspond to the macro coverage areas 204 of FIG. 2. As shown in FIG. 12, access terminals 1206 (e.g., access terminals 1206A-1206L) may be dispersed at various locations throughout the system over time. Each access terminal 1206 may communicate with one or more access points 1204 on a forward link ("FL") and/or a reverse link ("RL") at a given moment, depending upon whether the access terminal 1206 is active and whether it is in soft handover, for example. Through the use of this cellular scheme, the wireless communication system 1200 may provide service over a large geographic region. For example, each of the macro cells 1202A-1202G may cover a few blocks in a neighborhood or several square miles in rural environment.

FIG. 13 illustrates an example how one or more femto nodes may be deployed within a network environment (e.g., the system 1200). In the system 1300 of FIG. 13, multiple femto nodes 1310 (e.g., femto nodes 1310A and 1310B) are installed in a relatively small area coverage network environment (e.g., in one or more user residences 1330). Each femto node 1310 may be coupled to a wide area network 1340 (e.g., the Internet) and a mobile operator core network 1350 (e.g., comprising network nodes as discussed herein) via a DSL router, a cable modem, a wireless link, or other connectivity means (not shown).

The owner of a femto node 1310 may subscribe to mobile service, such as, for example, 3G mobile service offered through the mobile operator core network 1350. In addition, an access terminal 1320 may be capable of operating both in macro environments and in smaller area coverage (e.g., residential) network environments. In other words, depending on the current location of the access terminal 1320, the access terminal 1320 may be served by a macro cell access point 1360 associated with the mobile operator core network 1350 or by any one of a set of femto nodes 1310 (e.g., the femto nodes 1310A and 1310B that reside within a corresponding user residence 1330). For example, when a subscriber is outside his home, the subscriber may be served by a standard macro access point (e.g., access point 1360) and when the subscriber is near or inside his home, the subscriber may be served by a femto node (e.g., node 1310A). Here, a femto node 1310 may be backward compatible with legacy access terminals 1320.

A femto node 1310 may be deployed on a single frequency or, in the alternative, on multiple frequencies. Depending on the particular configuration, the single frequency or one or more of the multiple frequencies may overlap with one or more frequencies used by a macro access point (e.g., access point 1360).

In some aspects, an access terminal 1320 may be configured to connect to a preferred femto node (e.g., the home femto node of the access terminal 1320) whenever such connectivity is possible. For example, whenever the access terminal 1320A is within the user's residence 1330, it may be desired that the access terminal 1320A communicate only with the home femto node 1310A or 1310B.

In some aspects, if the access terminal 1320 operates within the macro cellular network 1350 but is not residing on its most preferred network (e.g., as defined in a preferred roaming list), the access terminal 1320 may continue to search for the most preferred network (e.g., the preferred femto node 1310) using a Better System Reselection ("BSR"), which may involve a periodic scanning of available systems to determine whether better systems are currently available, and subsequent efforts to associate with such preferred systems. With the acquisition entry, the access terminal 1320 may limit the search for specific band and channel. For example, the search for the most preferred system may be repeated periodically. Upon discovery of a preferred femto node 1310, the access terminal 1320 selects the femto node 1310 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1310 that reside within the corresponding user residence 1330). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node or relay node may provide the same or similar functionality for a different (e.g., larger) coverage area. For example, a pico node or a relay node may be restricted, a home pico node or home relay node may be defined for a given access terminal, and so on.

The teachings herein may be implemented in various types of communication devices. In some aspects, the teachings herein may be implemented in wireless devices that may be deployed in a multiple access communication system that may simultaneously support communication for multiple wireless access terminals. Here, each terminal may communicate with one or more access points via transmissions on the forward and reverse links. The forward link (also known as the downlink) refers to the communication link from the access points to the terminals, and the reverse link (also known as the uplink) refers to the communication link from the terminals to the access points. This communication link may be established via a single-in-single-out system, a multiple-in-multiple-out ("MIMO") system, or some other type of system.

Figure 14:
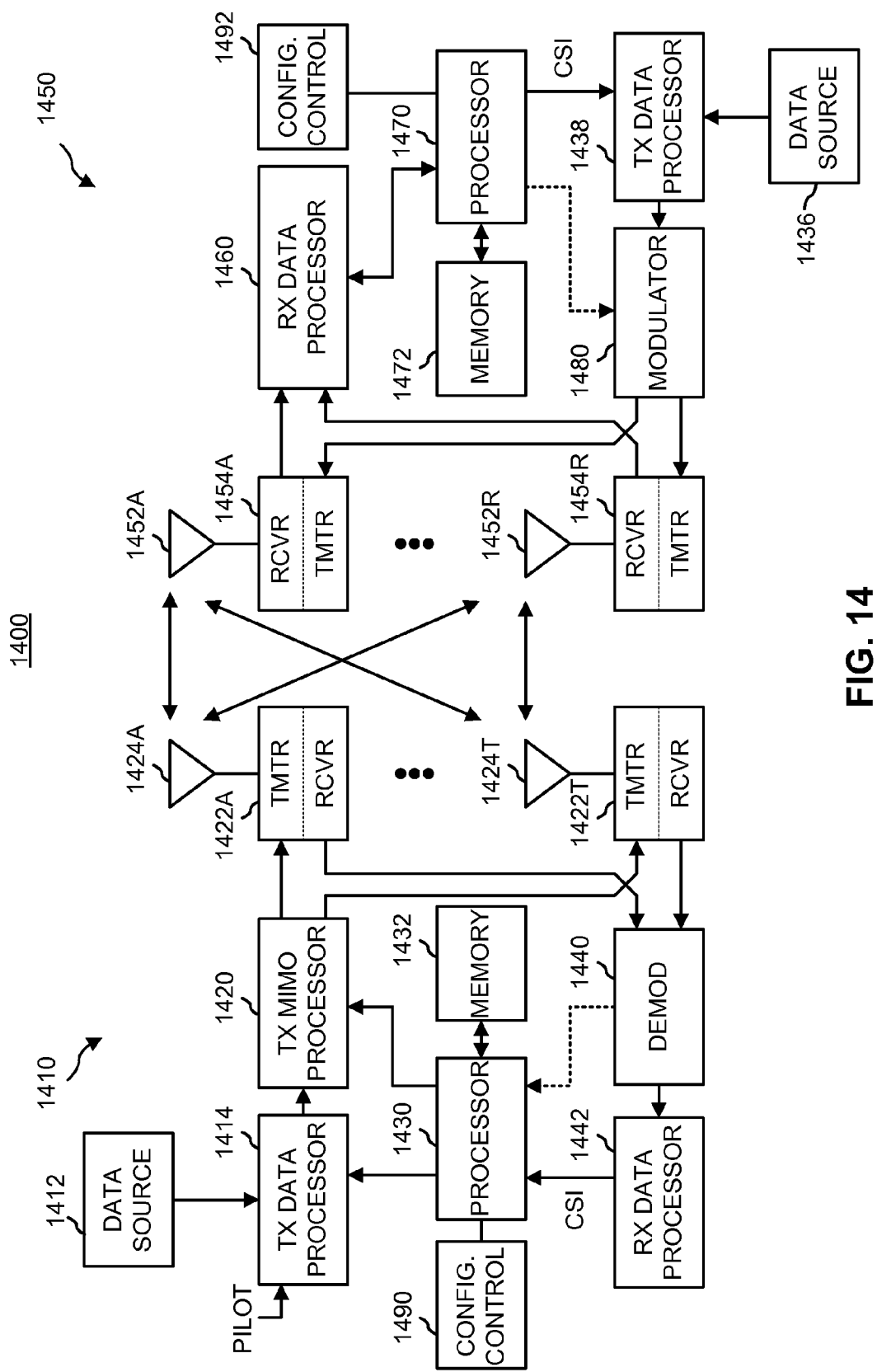
FIG. 14 is a simplified block diagram of several sample aspects of communication components.
Figure 15:
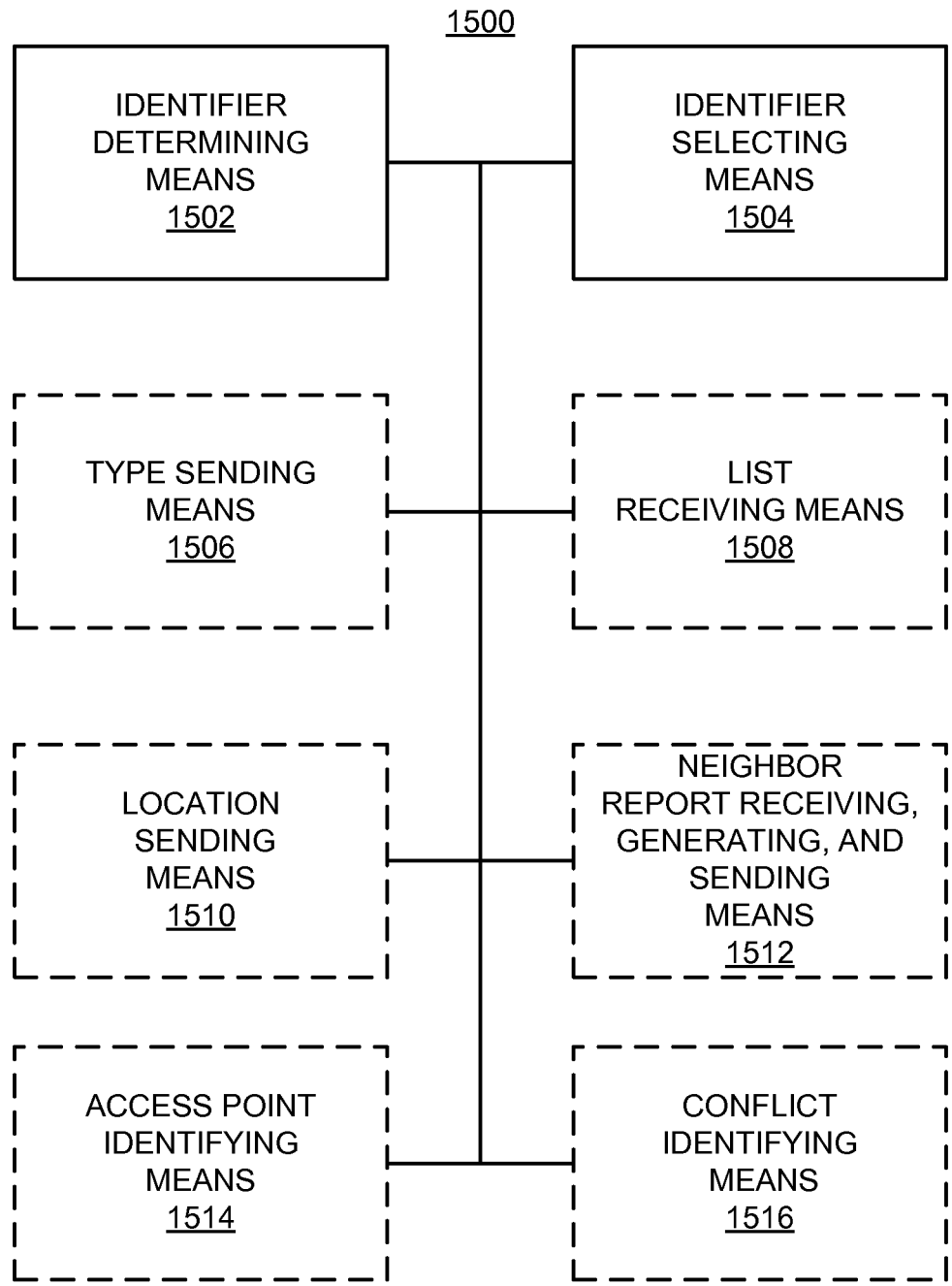
FIGS. 15-22 are simplified block diagrams of several sample aspects of apparatuses configured to perform configuration-related operations as taught herein.
Figure 16:
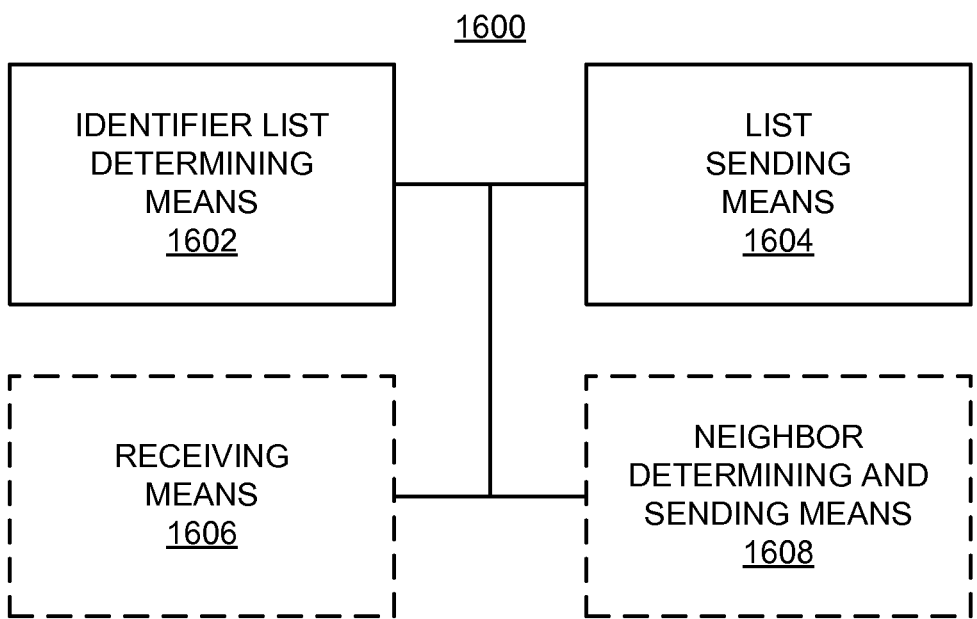
Figure 17:
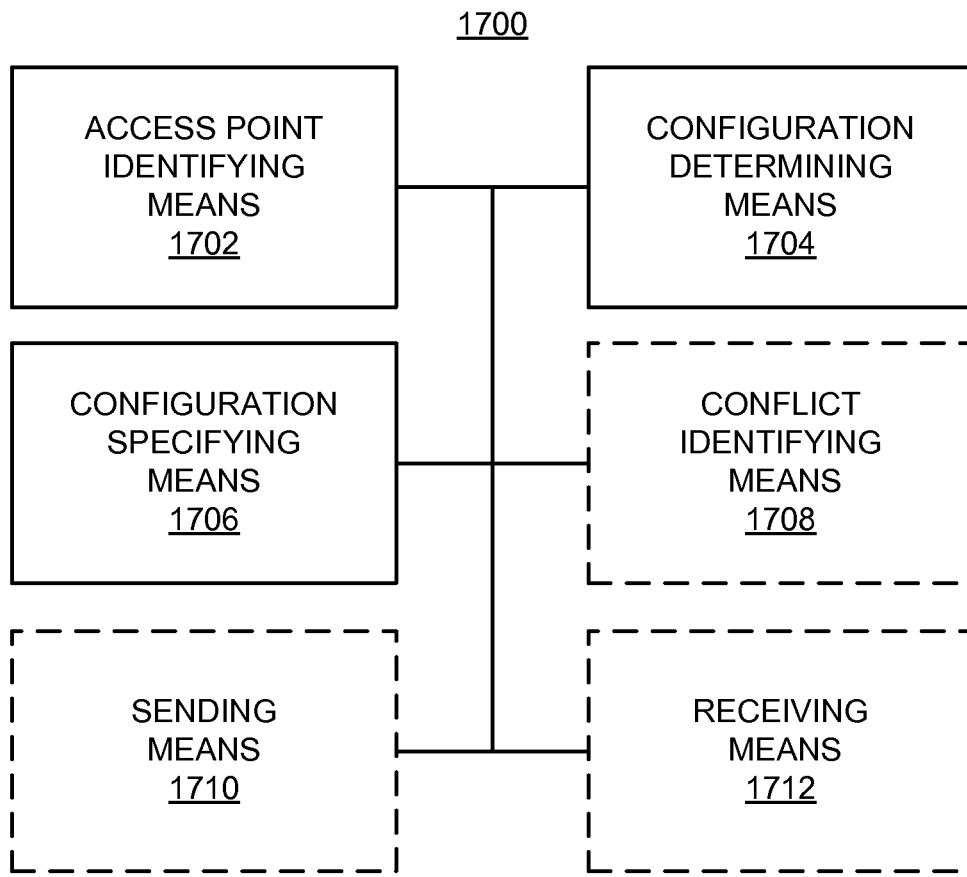
Figure 18:
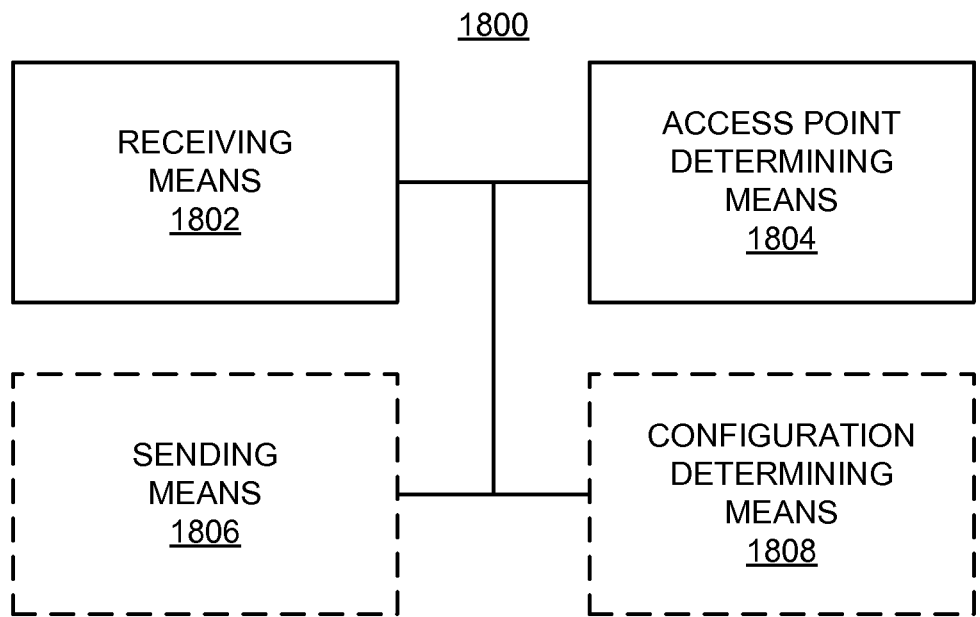
Figure 19:
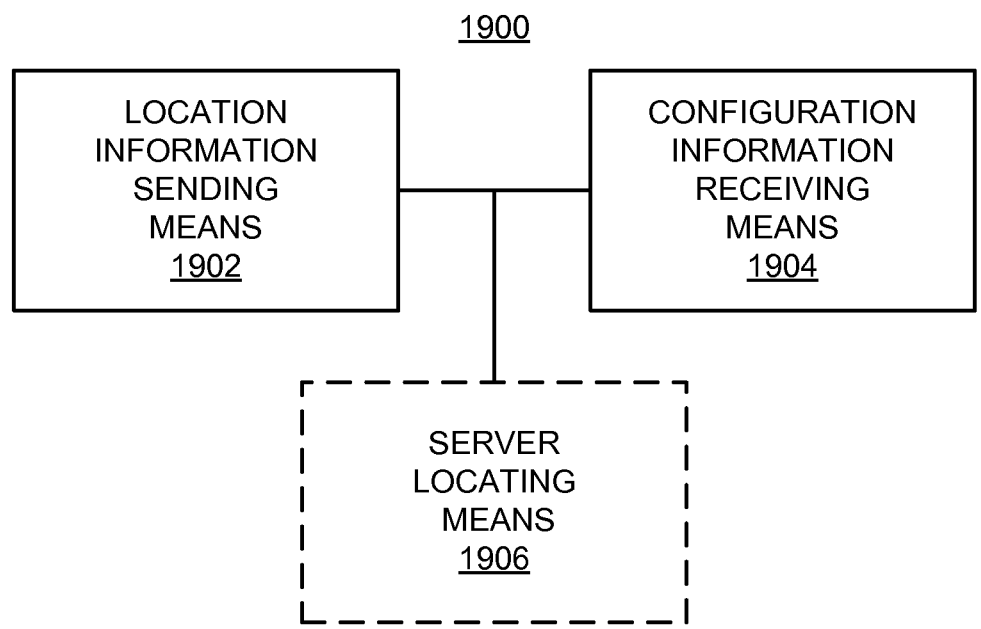
Figure 20:
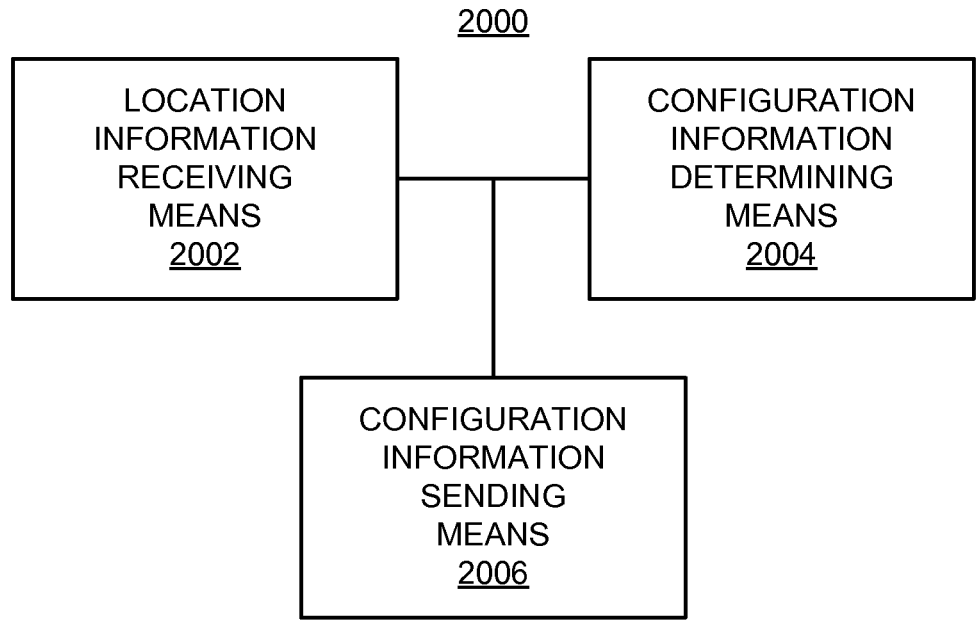
Figure 21:
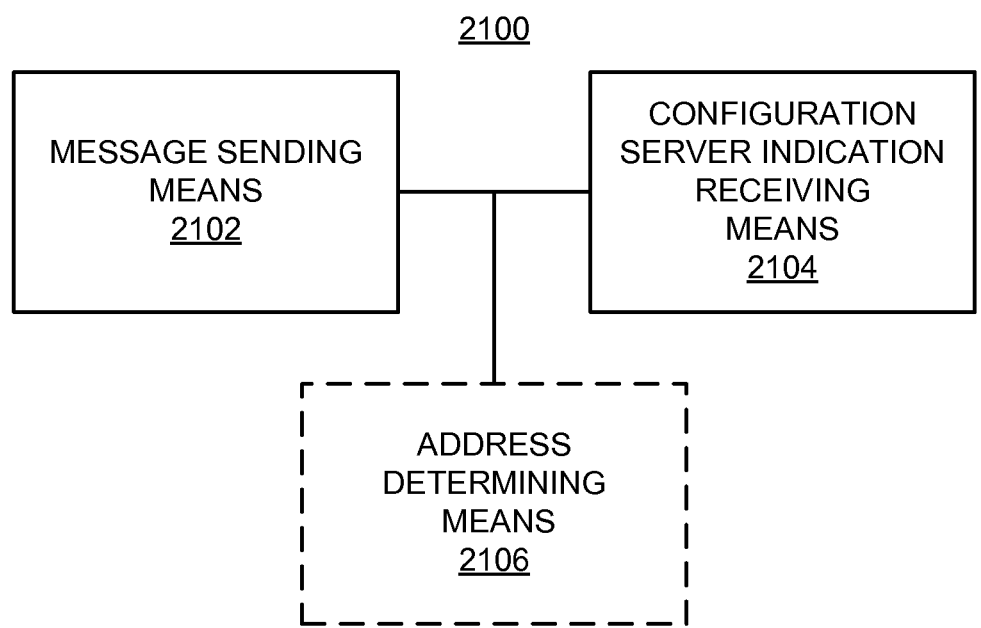
Figure 22:
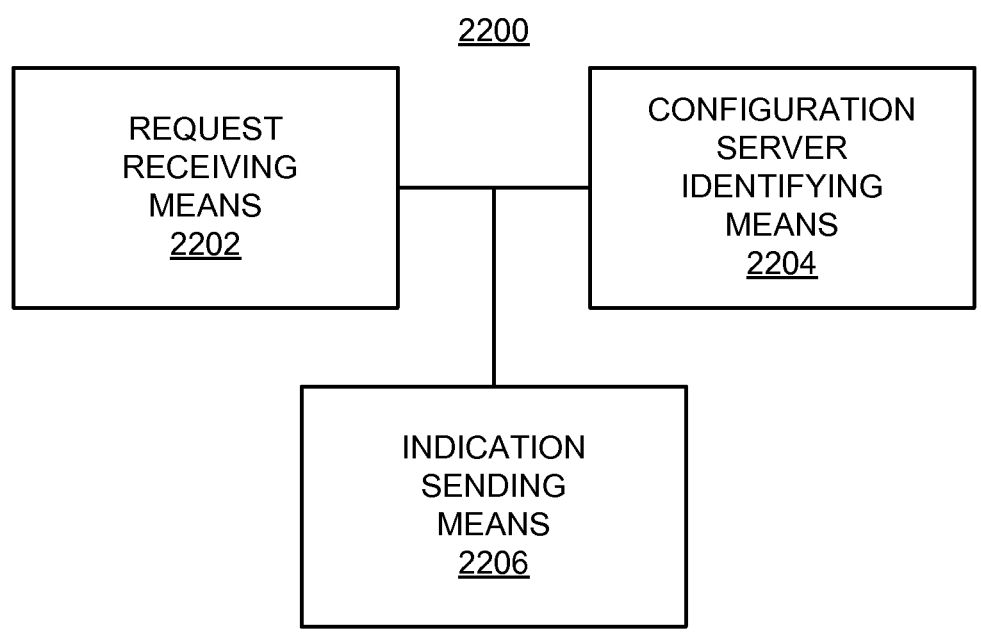

For illustration purposes, FIG. 14 describes sample communication components that may be employed in a wireless device in the context of a MIMO-based system 800. The system 1400 employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

The system 1400 may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

The system 1400 includes a wireless device 1410 (e.g., an access point) and a wireless device 1450 (e.g., an access terminal). At the device 1410, traffic data for a number of data streams is provided from a data source 1412 to a transmit ("TX") data processor 1414.

In some aspects, each data stream is transmitted over a respective transmit antenna. The TX data processor 1414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers ("XCVR") 1422A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the device 1450, the transmitted modulated signals are received by $N_R$ antennas 1452A through 1452R and the received signal from each antenna 1452 is provided to a respective transceiver ("XCVR") 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive ("RX") data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator ("DEMOD") 1440, and processed by a RX data processor 1442 to extract the reverse link message transmitted by the device

1450. The processor 1430 then determines which pre-coding matrix to use for determining the beam-forming weights then processes the extracted message.

FIG. 14 also illustrates that the communication components may include one or more components that perform configuration ("CONFIG.") control operations as taught herein. For example, a configuration control component 1490 may cooperate with the processor 1430 and/or other components of the device 1410 to send/receive signals to/from another device (e.g., device 1450) as taught herein. Similarly, a configuration control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the configuration control component 1490 and the processor 1430 and a single processing component may provide the functionality of the configuration control component 1492 and the processor 1470.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 15-22, apparatuses 1500, 1600, 1700, 1800, 1900, 2000, 2100, and 2200 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 15-22 are optional.

The apparatuses 1500, 1600, 1700, 1800, 1900, 2000, 2100, and 2200 may include one or more modules that may perform one or more of the functions described above with regard to various figures. For example, an identifier determining means 1502 or a conflict identifying means 1516 may correspond to, for example, an identifier determiner as discussed herein. An identifier selecting means 1504 may correspond to, for example, an identifier selector as discussed herein. A type sending means 1506 or a location sending means 1510 may correspond to, for example, a transmitter as discussed herein. A list receiving means 1508 may correspond to, for example, a receiver as discussed herein. A neighbor receiving, generating and sending means 1512 and an access point identifying means 1514 may correspond to, for example, a neighbor discovery controller as discussed herein. An identifier list determining means 1602 may correspond to, for example, a configuration controller as discussed herein. A list sending means 1604 may correspond to, for example, a transmitter as discussed herein. A receiving means 1606 may correspond to, for example, a receiver as discussed herein. A neighbor determining and sending means 1608 may correspond to, for example, a neighbor determiner as discussed herein. An access point identifying means 1702 may correspond to, for example, a neighbor discovery controller as discussed herein. A configuration determining means 1704 may correspond to, for example, a configuration determiner as discussed herein. A configuration specifying means 1706 may correspond to, for example, a configuration controller as discussed herein. A conflict identifying means 1708 may correspond to, for example, a configuration determiner as discussed herein. A sending means 1710 may correspond to, for example, a transmitter as discussed herein. A receiving means 1712 may correspond to, for example, a receiver as discussed herein. A receiving means 1802 may correspond to, for example, a receiver as discussed herein. An access point determining means 1804 may correspond to, for example, a neighbor determiner as discussed herein. A sending means 1806 may correspond to, for example, a transmitter as discussed herein. A configuration determining means 1808 may correspond to, for example, a configuration controller as discussed herein. A location information sending means 1902 may correspond to, for example, a location determiner as discussed herein. A configuration information receiving means 1904 may correspond to, for example, a configuration controller as discussed herein. A server locating means 1906 may correspond to, for example, a communication controller as discussed herein. A location information receiving means 2002 may correspond to, for example, a receiver as discussed herein. A configuration information determining means 2004 may correspond to, for example, a configuration controller as discussed herein. A configuration information sending means 2006 may correspond to, for example, a transmitter as discussed herein. A message sending means 2102 may correspond to, for example, a transmitter as discussed herein. A configuration server indication receiving means 2104 may correspond to, for example, a receiver as discussed herein. An address determining means 2106 may correspond to, for example, a communication controller as discussed herein. A request receiving means 2202 may correspond to, for example, a receiver as discussed herein. A configuration server identifying means 2204 may correspond to, for example, a configuration server selector as discussed herein. An indication sending means 2206 may correspond to, for example, a transmitter as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

In view of the above, in some aspects a first method of communication comprises: sending, from an access point, information indicative of a location of the access point; and receiving, at the access point, configuration information for the access point, wherein the configuration information is based on the information indicative of the location. In addition, in some aspects at least one of the following also may apply to the first method of communication: the configuration information comprises at least one RF parameter; the configuration information comprises at least one of the group consisting of: a frequency band, a carrier frequency, a pilot identifier, a maximum transmit power, and a transmit power profile; the access point sends the information indicative of the location to a configuration server, and the access point receives the configuration information from the configuration server; the method further comprises receiving a request from the configuration server for the information indicative of the location, wherein the access point sends the information indicative of the location in response to the request; the method further comprises locating the configuration server; the configuration information comprises at least one optimization parameter; wherein the information indicative of the location indicates at least one of the group consisting of: a city within which the access point is located, a country within which the access point is located, a macro access point that serves the access point, a zone with which the access point is associated, a cell with which the access point is communicating, GPS coordinates, a geographic location, and a street address; the access point comprises a femto node or a relay node.

In some aspects a second method of communication comprises: receiving information indicative of a location of an access point; determining configuration information for the access point based on the information indicative of the location; and sending the configuration information to the access point. In addition, in some aspects at least one of the following also may apply to the second method of communication: the configuration information comprises at least one RF parameter; the configuration information comprises at least one of the group consisting of: a frequency band, a carrier frequency, a pilot identifier, a maximum transmit power, and a transmit power profile; the method further comprises sending a request for the information indicative of the location, wherein the information indicative of the location is received in response to the request; the configuration information comprises at least one optimization parameter; the information indicative of the location indicates at least one of the group consisting of: a city within which the access point is located, a country within which the access point is located, a macro access point that serves the access point, a zone with which the access point is associated, a cell with which the access point is communicating, GPS coordinates, a geographic location, and a street address; the method is performed by a configuration server.

In some aspects a third method of communication comprises: sending a first message to a first configuration server to obtain configuration information for an access point; receiving an indication of a second configuration server from the first configuration server in response to the first message; and sending a second message to the second configuration server to obtain the configuration information for the access point. In addition, in some aspects at least one of the following also may apply to the third method of communication: the indication comprises an address of the second configuration server; the method further comprises determining, based on the indication, an address of the second configuration server; the first message comprises information indicative of a location of the access point, and the indication of the second configuration server is received based on the information indicative of the location; the information indicative of the location indicates at least one of the group consisting of: a city within which the access point is located, a country within which the access point is located, a macro access point that serves the access point, a zone with which the access point is associated, a cell with which the access point is communicating, an operator network within which the access point is serving, GPS coordinates, a geographic location, and a street address; the configuration information comprises at least one RF parameter; the configuration information comprises at least one of the group consisting of: a frequency band, a carrier frequency, a pilot identifier, a maximum transmit power, and a transmit power profile; the configuration information comprises at least one optimization parameter; the access point comprises a femto node or a relay node.

In some aspects a fourth method of communication comprises: receiving, at a first configuration server, a request for configuration information for an access point; identifying a second configuration server that may provide the configuration information; and sending an indication of the second configuration server in response to the request. In addition, in some aspects at least one of the following also may apply to the fourth method of communication: the identification of the second configuration server is based on loading at the first configuration server and/or loading at the second configuration server; the identification of the second configuration server is based on a location of the first configuration server and/or a location of the second configuration server; the request comprises information indicative of a location of the access point, and the identification of the second configuration server is based on the information indicative of the location; the information indicative of the location indicates at least one of the group consisting of: a city within which the access point is located, a country within which the access point is located, a macro access point that serves the access point, a zone with which the access point is associated, a cell with which the access point is communicating, an operator network within which the access point is serving, GPS coordinates, a geographic location, and a street address; the indication comprises an address of the second configuration server; the configuration information comprises at least one RF parameter; the configuration information comprises at least one of the group consisting of: a frequency band, a carrier frequency, a pilot identifier, a maximum transmit power, and a transmit power profile; the configuration information comprises at least one optimization parameter.

In some aspects a fifth method of communication comprises: identifying at least one neighbor access point of a first access point; determining at least one configuration of the at least one neighbor access point; and specifying, at the first access point, at least one configuration for the first access point based on the at least one configuration of the at least one neighbor access point. In addition, in some aspects at least one of the following also may apply to the fifth method of communication: the specification of the at least one configuration comprises specifying at least one RF parameter; the specification of the at least one configuration comprises specifying at least one of the group consisting of: a frequency band, a carrier frequency, a pilot identifier, a maximum transmit power, a transmit power profile; and a set of carrier priorities; the specification of the at least one configuration comprises specifying a power profile that is identical to a power profile of the at least one neighbor access point; the specification of the at least one configuration comprises specifying a pilot identifier that is different than any pilot identifiers used by the at least one neighbor access point; the specification of the at least one configuration comprises specifying a set of carrier priorities that is complementary to another set of carrier priorities used by the at least one neighbor access point; the method further comprises: identifying a conflict between the determined at least one configuration and a configuration previously specified for the first access point, and specifying a non-conflicting configuration for the first access point in response to the identification of the conflict; the determination of the at least one configuration comprises at least one of the group consisting of: receiving configuration information over-the-air at the first access point, receiving configuration information at the first access point from an associated access point, receiving configuration information at the first access point via a backhaul, and receiving configuration information at the first access point from a server; the determination of the at least one configuration comprises receiving information that indicates at least one configuration of at least one multi-hop neighbor access point; the identification of the at least one neighbor access point comprises: sending, by the first access point, information indicative of a location of the first access point and/or a power profile of the first access point, and receiving, at the first access point, an indication of the at least one neighbor access point, wherein the indication is based on the sent information; the first access point sends the information indicative of the location to a configuration server, and the first access point receives the indication from the configuration server; the first access point sends the information indicative of the location to at least one other neighbor access point, and the first access point receives the indication from the least one other neighbor access point; the information indicative of the location indicates at least one of the group consisting of: a city within which the first access point is located, a country within which the first access point is located, a macro access point that serves the first access point, a zone with which the first access point is associated, a cell with which the first access point is communicating, an operator network within which the first access point is serving, GPS coordinates, a geographic location, and a street address; the first access point comprises a femto node or a relay node.

In some aspects a sixth method of communication comprises: receiving information indicative of a location of a first access point; determining at least one neighbor access point of the first access point based on the information indicative of the location; and sending an indication of the at least one neighbor access point to the first access point. In addition, in some aspects at least one of the following also may apply to the sixth method of communication: the method further comprises receiving information indicative of a power profile of the first access point, wherein the determination of the at least one neighbor access point is further based on the information indicative of the power profile; the method further comprises receiving information indicative of at least one power profile of at least one other access point, wherein the determination of the at least one neighbor access point is further based on the information indicative of the at least one power profile; the method further comprises: determining at least one configuration of the at least one neighbor access point, and sending an indication of the at least one configuration to the first access point; the at least one configuration comprises at least one RF parameter; the at least one configuration comprises at least one of the group consisting of: a frequency band, a carrier frequency, a pilot identifier, a maximum transmit power, and a transmit power profile; the information indicative of the location indicates at least one of the group consisting of: a city within which the first access point is located, a country within which the first access point is located, a macro access point that serves the first access point, a zone with which the first access point is associated, a cell with which the first access point is communicating, GPS coordinates, a geographic location, and a street address; the method is performed by a configuration server.

In some aspects, functionality corresponding to one or more of the above aspects relating to the first, second, third, fourth, fifth, and sixth methods of communication may be implemented, for example, in an apparatus using structure as taught herein. In addition, a computer-program product may comprise codes configured to cause a computer to provide functionality corresponding to one or more of the above aspects relating to the first, second, third, fourth, fifth, and sixth methods of communication.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   determining, at an access point, at least a first identifier transmitted by at least one other access point; and
   selecting, based on the at least a first identifier, a second identifier to be transmitted by the access point wherein the second identifier comprises an identifier for a cell associated with the access point;
   wherein the determination of the at least a first identifier comprises receiving one of at least a first identifier of at least one multi-hop neighbor access point and identifier information from at least one associated user equipment.

2. The method of claim 1, wherein the second identifier comprises a pilot identifier, a physical cell identifier, or a primary scrambling sequence.

3. The method of claim 2, wherein the access point comprises an eNodeB and the at least one other access point comprises at least one other eNodeB.

4. The method of claim 1, wherein the determining includes:
   receiving a list of physical cell identifiers;
   removing, from the list, at least one of the group consisting of: a physical cell identifier reported by a user equipment, a physical cell identifier reported by a neighbor eNodeB, and a physical cell identifier received over-the-air using a downlink receiver; and
   wherein the selecting includes selecting a physical cell identifier for the cell after the removal.

5. The method of claim 4, wherein the selecting the physical cell identifier comprises randomly selecting a physical cell identifier from the list after the removal.

6. The method of claim 1, wherein the selecting of the second identifier comprises selecting an identifier that is not used by the at least one other access point.

7. The method of claim 1, wherein the selecting of the second identifier comprises selecting the second identifier from a list of identifiers.

8. The method of claim 7, wherein the list comprises a subset of a set of identifiers.

9. The method of claim 7, wherein the selecting of the second identifier further comprises selecting the second identifier in a random manner from the list.

10. The method of claim 7, further comprising receiving the list from a configuration server.

11. The method of claim 10, wherein the configuration server comprises an operations, accounting, and management entity.

12. The method of claim 7, wherein the list is operator configurable.

13. The method of claim 7, wherein the list is associated with at least one specified type of access point.

14. The method of claim 13, wherein the at least one specified type relates to at least one of the group consisting of: access point transmit power; access point mobility; and whether the access point is restricted to not provide, for at least one node, at least one of: signaling, data access, registration, paging, or service.

15. The method of claim 7, further comprising:
   sending information indicative of a type of the access point to a server; and
   receiving the list from the server, wherein the list is based on the type.

16. The method of claim 7, wherein the list is associated with a geographic region.

17. The method of claim 7, wherein the list is based on a location of the access point.

18. The method of claim 7, further comprising:
   sending information indicative of a location of the access point to a server; and
   receiving the list from the server, wherein the list is based on the information indicative of the location.

19. The method of claim 1, wherein the at least a first identifier of the at least one multi-hop neighbor access point is received via at least one neighbor report.

20. The method of claim 1, wherein the selection of the identifier for the access point comprises:
   classifying each identifier of the at least a first identifier according to an associated number of hops to the access point; and
   selecting an identifier based on the classification if a non-conflicting identifier is not available.

21. The method of claim 1, wherein the determination of the at least a first identifier comprises:
   receiving information relating to a second-hop or third-hop access point from a first-hop access point; and
   communicating with the second-hop or third-hop access point to determine an identifier used by the second-hop or third-hop access point.

22. The method of claim 1, further comprising:
   receiving a first neighbor report from one of the at least one other access point;
   generating a second neighbor report that identifies any access points identified by the first neighbor report; and
   sending the second neighbor report in response to a neighbor discovery request.

23. The method of claim 1, further comprising identifying the at least one other access point by receiving signals over-the-air from at least one neighbor access point.

24. The method of claim 1, further comprising identifying the at least one other access point by receiving an indication of at least one neighbor access point from a configuration server.

25. The method of claim 1, further comprising:
   identifying a conflict between the determined at least a first identifier and an identifier previously specified for the access point; and
   specifying a non-conflicting identifier for the access point in response to the identification of the conflict.

26. The method of claim 25, wherein the identification of the conflict comprises receiving an indication of the conflict from an associated user equipment.

27. The method of claim 1, wherein the access point comprises a femto node or a relay node.

28. An apparatus for communication, comprising:
   an identifier determiner configured to determine, at an access point, at least a first identifier transmitted by at least one other access point; and
   an identifier selector configured to select, based on the at least a first identifier, a second identifier to be transmitted by the access point wherein the second identifier comprises an identifier for a cell associated with the access point;
   wherein the identifier determiner is configured to receive one of at least a first identifier of at least one multi-hop neighbor access point and identifier information from at least one associated user equipment.

29. The apparatus of claim 28, wherein the second identifier comprises a pilot identifier, a physical cell identifier, or a primary scrambling sequence.

30. The apparatus of claim 29, wherein the access point comprises an eNodeB and the at least one other access point comprises at least one other eNodeB.

31. The apparatus of claim 29, wherein the identifier determiner is further configured for:
receiving a list of physical cell identifiers;
removing, from the list, at least one of the group consisting of: a physical cell identifier reported by a user equipment, a physical cell identifier reported by a neighbor eNodeB, and a physical cell identifier received over-the-air using a downlink receiver; and
wherein the identifier selector is further configured for selecting a physical cell identifier for the cell after the removal.

32. The apparatus of claim 31, wherein the selecting the physical cell identifier comprises randomly selecting a physical cell identifier from the list after the removal.

33. The apparatus of claim 28, wherein the selecting the second identifier comprises selecting an identifier that is not used by the at least one other access point.

34. The apparatus of claim 28, wherein the selecting the second identifier comprises selecting the identifier from a list of identifiers.

35. The apparatus of claim 34, wherein the list comprises a subset of a set of identifiers.

36. The apparatus of claim 34, wherein the selecting the second identifier further comprises selecting the second identifier in a random manner from the list.

37. The apparatus of claim 34, wherein the list is associated with at least one specified type of access point.

38. The apparatus of claim 37, wherein the at least one specified type relates to at least one of the group consisting of: access point transmit power; access point mobility; and whether the access point is restricted to not provide, for at least one node, at least one of: signaling, data access, registration, paging, or service.

39. The apparatus of claim 34, wherein the list is associated with a geographic region.

40. The apparatus of claim 34, wherein the list is based on a location of the access point.

41. The apparatus of claim 28, wherein the at least one identifier of the at least one multi-hop neighbor access point is received via at least one neighbor report.

42. An apparatus for communication, comprising:
means for determining, at an access point, at least a first identifier transmitted by at least one other access point; and
means for selecting, based on the at least a first identifier, a second identifier to be transmitted by the access point wherein the second identifier comprises an identifier for a cell associated with the access point;
wherein the means for determining is configured to receive one of at least a first identifier of at least one multi-hop neighbor access point and identifier information from at least one associated user equipment.

43. The apparatus of claim 42, wherein the second identifier comprises a pilot identifier, a physical cell identifier, or a primary scrambling sequence.

44. The apparatus of claim 43, wherein the access point comprises an eNodeB and the at least one other access point comprises at least one other eNodeB.

45. The apparatus of claim 43, wherein the means for determining further includes:
means for receiving a list of physical cell identifiers;
means for removing, from the list, at least one of the group consisting of: a physical cell identifier reported by a user equipment, a physical cell identifier reported by a neighbor eNodeB, and a physical cell identifier received over-the-air using a downlink receiver; and
wherein the means for selecting further includes means for selecting a physical cell identifier the cell after the removal.

46. The apparatus of claim 45, wherein the selecting of the physical cell identifier comprises randomly selecting a physical cell identifier from the list after the removal.

47. The apparatus of claim 42, wherein the selecting of the second identifier comprises selecting an identifier that is not used by the at least one other access point.

48. The apparatus of claim 42, wherein the selecting of the second identifier comprises selecting the identifier from a list of identifiers.

49. The apparatus of claim 48, wherein the list comprises a subset of a set of identifiers.

50. The apparatus of claim 48, wherein the selecting of the second identifier further comprises selecting the second identifier in a random manner from the list.

51. The apparatus of claim 48, wherein the list is associated with at least one specified type of access point.

52. The apparatus of claim 51, wherein the at least one specified type relates to at least one of the group consisting of: access point transmit power; access point mobility; and whether the access point is restricted to not provide, for at least one node, at least one of: signaling, data access, registration, paging, or service.

53. The apparatus of claim 48, wherein the list is associated with a geographic region.

54. The apparatus of claim 48, wherein the list is based on a location of the access point.

55. The apparatus of claim 42, wherein the at least a first identifier of the at least one multi-hop neighbor access point is received via at least one neighbor report.

56. A computer-program product, comprising:
a non-transitory computer-readable medium having a computer readable program code embodied therein, said computer readable program code adapted to be executed to implement a method of communication, comprising
determining, at an access point, at least a first identifier transmitted by at least one other access point; and
selecting, based on the at least a first identifier, a second identifier to be transmitted by the access point wherein the second identifier comprises an identifier for a cell associated with the access point;
wherein determining the at least a first identifier includes receiving one of at least a first identifier of at least one multi-hop neighbor access point and identifier information from at least one associated user equipment.

57. The computer-program product of claim 56, wherein the second identifier comprises a pilot identifier, a physical cell identifier, or a primary scrambling sequence.

58. The computer-program product of claim 57, wherein the access point comprises an eNodeB and the at least one other access point comprises at least one other eNodeB.

59. The computer-program product of claim 57, wherein the codes further includes codes for causing the computer to:
receive a list of physical cell identifiers;
remove from the list, at least one of the group consisting of: a physical cell identifier reported by a user equipment, a physical cell identifier reported by a neighbor eNodeB, and a physical cell identifier received over-the-air using a downlink receiver; and
select a physical cell identifier for the cell after the removal.

60. The computer-program product of claim 59, wherein the selecting of the physical cell identifier comprises randomly selecting a physical cell identifier from the list after the removal.

61. The computer-program product of claim 56, wherein the selecting of the second identifier comprises selecting an identifier that is not used by the at least one other access point.

62. The computer-program product of claim 56, wherein the selecting of the second identifier comprises selecting the second identifier from a list of identifiers.

63. The computer-program product of claim 62, wherein the list is associated with at least one specified type of access point.

64. The computer-program product of claim 62, wherein the list is based on a location of the access point.

65. A method of communication, comprising:
- determining, at an access point, at least a first identifier transmitted by at least one other access point; and
- selecting, based on the at least a first identifier, a second identifier to be transmitted by the access point wherein the second identifier comprises an identifier for a cell associated with the access point;
- wherein the selecting of the second identifier comprises selecting the second identifier from a list of identifiers and wherein the list is associated with at least one specified type of access point.

* * * * *